US012637824B2

(12) United States Patent
Lipscomb

(10) Patent No.: US 12,637,824 B2
(45) Date of Patent: May 26, 2026

(54) GROUND ANCHOR ASSEMBLY INCLUDING HIGH-LOAD GROUND ANCHOR AND METHOD OF USING SAME

(71) Applicant: WESTERN GREEN, LLC, Evansville, IN (US)

(72) Inventor: Chad Lipscomb, Evansville, IN (US)

(73) Assignee: Western Excelsior, LLC, Evansville, IN (US)

( * ) Notice: Subject to any disclaimer, the term of this patent is extended or adjusted under 35 U.S.C. 154(b) by 267 days.

(21) Appl. No.: 18/287,965

(22) PCT Filed: Apr. 26, 2022

(86) PCT No.: PCT/US2022/026348
§ 371 (c)(1),
(2) Date: Oct. 23, 2023

(87) PCT Pub. No.: WO2022/232144
PCT Pub. Date: Nov. 3, 2022

(65) Prior Publication Data
US 2024/0191451 A1     Jun. 13, 2024

Related U.S. Application Data

(60) Provisional application No. 63/179,749, filed on Apr. 26, 2021.

(51) Int. Cl.
*E02D 17/20*          (2006.01)
*A01G 13/02*          (2006.01)
(Continued)

(52) U.S. Cl.
CPC ............. *E02D 5/803* (2013.01); *A01G 13/38* (2025.01); *E02D 17/202* (2013.01)

(58) Field of Classification Search
CPC ........... E02D 5/803; E02D 5/80; E02D 17/20; E02D 17/202; A01G 13/38
See application file for complete search history.

(56) References Cited

U.S. PATENT DOCUMENTS 936,824 A * 10/1909 Simpson et al. ........ E02D 5/803
52/163
4,993,870 A 2/1991 Bridgewater
(Continued)

FOREIGN PATENT DOCUMENTS

WO          2017220952 A1     12/2017

OTHER PUBLICATIONS

International Search Report and Written Opinion issued in counterpart PCT Application No. PCT/US2022/026348 dated Jul. 20, 2022 (fourteen (14) pages).

*Primary Examiner* — Benjamin F Fiorello
(74) *Attorney, Agent, or Firm* — Eric Mills; Todd A. Serbin; Maynard Nexsen PC

(57)          ABSTRACT

A ground anchor assembly including high-load ground anchor and method of using same is disclosed. For example, the presently disclosed high-load ground anchor assembly may include a load-bearing top cap tethered to the ground anchor via a cable tendon. In some embodiments, the ground anchor may include a substantially cylindrical body that has a tapered piercing end and a flat driving end and wherein the flat driving end has a central driving hole. Additionally, the high-load ground anchor may include a pair of outwardly extending side wings along one side of the body and a raised securing portion on the side of body opposite the side wings. Further, a method of installing the presently disclosed ground anchor assembly including the high-load ground anchor is provided.

56 Claims, 43 Drawing Sheets

(51) Int. Cl.
     *A01G 13/38*        (2025.01)
     *E02D 5/80*        (2006.01)

(56)               References Cited

U.S. PATENT DOCUMENTS

| | | | |
|---|---|---|---|
| 5,352,003 A * | 10/1994 | Bystry | F16G 11/108 |
| | | | 292/307 R |
| 5,815,993 A | 10/1998 | Castola et al. | |
| 5,820,176 A * | 10/1998 | Leon | F16G 11/14 |
| | | | 292/323 |
| 6,238,143 B1 | 5/2001 | Zablonski | |
| 6,345,847 B1 | 2/2002 | Dreisbach et al. | |
| 7,534,073 B2 * | 5/2009 | Stahm | E02D 5/80 |
| | | | 405/259.1 |
| 9,447,556 B2 * | 9/2016 | Daniel | E21D 20/00 |
| 11,536,000 B2 * | 12/2022 | Giemza | B09B 1/004 |
| D974,151 S * | 1/2023 | Chen | D8/385 |
| D974,152 S * | 1/2023 | Chen | D8/354 |
| 2008/0034682 A1 | 2/2008 | Carpenter | |
| 2012/0243949 A1 | 9/2012 | Schneider et al. | |
| 2014/0037387 A1 | 2/2014 | Ferreira et al. | |
| 2014/0112723 A1 | 4/2014 | Daniel et al. | |
| 2016/0102442 A1 * | 4/2016 | Somerfield | E02D 5/803 |
| | | | 52/163 |
| 2017/0089025 A1 * | 3/2017 | Chilson | E02D 5/803 |

* cited by examiner

110

110

110

110

130

130

130

130

530

1.6"

530

530

530

2.2"

7.1"

3810

3810

3831          3828

3810

3810

GROUND ANCHOR ASSEMBLY INCLUDING HIGH-LOAD GROUND ANCHOR AND METHOD OF USING SAME

RELATED APPLICATIONS

This application is a 35 U.S.C. § 371 U.S. national phase entry of International Patent Application No. PCT/US2022/026348 having an international filing date of Apr. 26, 2022, which claims the benefit of priority under PCT Article 8 of U.S. Provisional Patent Application No. 63/179,749, filed Apr. 26, 2021, the contents of which are incorporated herein by reference in their entirety.

RELATED APPLICATIONS

This application claims the benefit of priority under PCT Article 8 of U.S. Provisional Patent Application No. 63/179,749, filed Apr. 26, 2021, the contents of which are incorporated herein by reference in their entirety.

TECHNICAL FIELD

The presently disclosed subject matter relates generally to ground or soil anchor systems and more particularly to a ground anchor assembly including high-load ground anchor and method of using same.

BACKGROUND

Anchor reinforced vegetation (ARV) systems exist today that are used, for example, for securing high-strength ground-stabilizing fabric in erosion control applications; securing poles, beams, frames, walls, or structures; securing hard armor to slopes, levees, and shorelines; and the like. ARV systems may include an arrangement of ground anchors driven into the ground that are tethered to other members on top of the ground. In one example, a percussion driven anchor (PDA) may be coupled via a cable tendon to a top cap installed at ground surface. PDAs are also called ground anchors, earth anchors, and mechanical anchors. However, certain drawbacks may be associated with current ARV systems and/or PDAs. For example, the pullout resistance of current PDAs may be limited, PDA and drive rod designs may be limited with respect to driving in challenging soil conditions, the cable grip mechanisms of current top caps may have limited grip strength and may be difficult to release, and current top caps may have limited load-bearing capacity. Current top caps and grips also require complex, and relatively expensive, production techniques and/or equipment.

SUMMARY OF THE INVENTION

There is provided in accordance with an aspect of the invention, a ground anchor assembly comprising: a top cap including a cable grip portion including at least one ball bearing; a ground anchor; and, a cable tendon tethered between the cable grip portion of the top cap and the ground anchor.

In an embodiment of the invention, the top cap comprises a load-bearing face plate that has an arrangement of openings that allow vegetation to grow through top cap.

In an embodiment of the invention, the load-bearing face plate comprises a sloped transition portion leading to a cable grip portion.

In an embodiment of the invention, the sloped transition portion and cable grip portion are substantially octagonal shaped thereby reducing stress concentrations and increasing gripping performance.

In an embodiment of the invention, the cable grip portion is a compartment or housing extending to one side of the load-bearing face plate and substantially perpendicular to a plane of the load-bearing face plate.

In an embodiment of the invention, the ground anchor assembly further comprises a cable grip mechanism installed in the cable grip portion.

In an embodiment of the invention, the cable grip mechanism comprises a keyhole-shaped shaft such that when the top cap is in use, the cable tendon extends through the keyhole-shaped shaft of the cable grip portion with an approach angle less than or equal to 10 degrees to the cable grip mechanism.

In an embodiment of the invention, the top cap includes a load-bearing face plate and wherein a key-hole shaped shaft of the cable grip portion is oriented transversely or vertically to the load-bearing face plate when the top cap is in use.

In an embodiment of the invention, the cable grip mechanism comprises a spring, a spring cap comprising a cable exit opening, a wedge component comprising a cable entrance opening, at least one ball bearing located at the end of the spring on a same side as the cable entrance opening of the wedged component and a release pin opening located near the ball bearing.

In an embodiment of the invention, the wedge component is spherical, cylindrical, wedge shaped or tapered.

In an embodiment of the invention, the wedge component continuously reduces in cross-section.

In an embodiment of the invention, the cable tendon is entirely in contact with the cable grip mechanism.

In an embodiment of the invention, the keyhole shape of the shaft keeps cable grip mechanism components in a chamber separate from the cable tendon.

In an embodiment of the invention, the release port aligns with the at least one ball bearing.

In an embodiment of the invention, the spring cap is octagonal shaped and is provided with screws for tightening onto the cable tendon to fix the cable to the top cap.

In an embodiment of the invention, the cable grip mechanism comprises two ball bearings for spreading out the gripping force applied to the cable tendon by the cable grip mechanism.

In an embodiment of the invention, one of the two ball bearings is smaller than the other.

In an embodiment of the invention, the smaller ball bearing is located closer to a cable entrance opening of the cable grip mechanism than the larger ball bearing.

In an embodiment of the invention, the smaller ball bearing is 10% smaller than the other ball bearing.

In an embodiment of the invention, the size of the smaller ball bearing is determined by a tapering characteristic of the cable grip mechanism.

In an embodiment of the invention, the cable tendon uses a 7×19 strand.

In an embodiment of the invention, the top cap is formed of at least one of a zinc alloy, a plastic, an aluminum, stainless steel, coated steel, and brass.

In an embodiment of the invention, the overall diameter of top cap may is about 101.7 mm and the overall depth of top cap is about 38 mm.

In an embodiment of the invention, the cable grip mechanism provides a one-way stop.

In an embodiment of the invention, the one-way stop includes a washer for load spreading.

In an embodiment of the invention, at least one of the size, shape, hardness, and surface finish of the at least one ball bearing is altered to modify grip performance of the at least one ball bearing.

In an embodiment of the invention, the top cap comprises at least one groove and at least one tab hole to allow the spring cap to be held in place without the use of transverse casting cores.

In an embodiment of the invention, the top cap comprises a crush ridge.

In an embodiment of the invention, the crush ridge follows around an outside circumference of a spring cap of the cable grip portion.

In an embodiment of the invention, the crush ridge is about twice the thickness of the spring cap.

In an embodiment of the invention, the ground anchor comprises a substantially cylindrical body with a tapered piercing end and a flat driving end.

In an embodiment of the invention, wherein the flat driving end has a central driving hole.

In an embodiment of the invention, the piercing end further comprises an arrangement of piercing end grooves and piercing end ribs.

In an embodiment of the invention, the tapered piercing end is generally conical and wherein the piercing end ribs are equally distanced apart and terminate at a leading edge, wherein the leading edge has the plurality of piercing end grooves, which are symmetrical.

In an embodiment of the invention, the ground anchor comprises at least one outwardly extending side wing.

In an embodiment of the invention, the ground anchor assembly further comprises a pair of outwardly extending side wings lying within the same plane.

In an embodiment of the invention, the ground anchor comprises a raised securing portion.

In an embodiment of the invention, the ground anchor further comprises at least one outwardly extending side wing lying in a plane transverse to the raised securing portion.

In an embodiment of the invention, the raised securing portion comprises a thru-hole used for securing the cable tendon to the ground anchor.

In an embodiment of the invention, the ground anchor is formed from at least one of a zinc alloy, ductile iron, aluminum, stainless steel, and brass.

In an embodiment of the invention, the ground anchor has a bell-shaped cross-section.

In an embodiment of the invention, the ground anchor has a cleat-shaped footprint.

In an embodiment of the invention, the flat driving end is configured with a strike face inside a driving hole provided to the flat driving end or on an end of the substantially cylindrical body at the flat driving end.

In an embodiment of the invention, the cable tendon is a ⅛-inch diameter zinc alloy-coated steel or steel cable.

In an embodiment of the invention, the ground anchor assembly further comprises a drive rod for driving ground anchor into the ground.

In an embodiment of the invention, the drive rod is configured to push against at least one strike face of the ground anchor, the at least one strike face located inside a driving hole of the ground anchor and/or on a flat driving end of the ground anchor.

In an embodiment of the invention, the ground anchor assembly further comprises a rod tip.

In an embodiment of the invention, the ground anchor assembly further comprises a flat shoulder portion, wherein the rod tip provides alignment of the drive rod during driving.

In an embodiment of the invention, wherein the driving rod is configured such that the flat shoulder portion strikes a flat driving end of the ground anchor without the rod tip striking the ground anchor during driving.

In an embodiment of the invention, the overall length of the drive rod is 4 feet and the diameter of the drive rod is 0.5 to 1 inch and wherein the length of the rod tip is 2-3 inches and the diameter of the rod tip is 0.4 to 0.5 inches.

In an embodiment of the invention, the rod tip tapers from 0.45 inches to 0.4 inches.

In an embodiment of the invention, the flat shoulder portion is 0.1 to 0.2 inches wide.

In an embodiment of the invention, the rod tip tapers from 0.435 inches to 0.41 inches.

In an embodiment of the invention, the flat shoulder portion is 0.1 to 0.2 inches wide.

In an embodiment of the invention, the overall length of the drive rod is 7 feet and the diameter of the drive rod is 0.5 to 1 inch and wherein the length of the rod tip is 4-5 inches and the diameter of the rod tip is 0.5 to 0.7 inches.

In an embodiment of the invention, the rod tip tapers from 0.65 inches to 0.565 inches.

In an embodiment of the invention, the flat shoulder portion is 0.1 to 0.2 inches wide.

In an embodiment of the invention, the overall length of the drive rod is 7 feet and the diameter of the drive rod is 0.5 to 1 inch and wherein the length of the rod tip is 6-7 inches and the diameter of the rod tip is 0.5 to 0.7 inches.

There is further provided in accordance with an aspect of the invention, a method of installing a ground anchor assembly, comprising: providing the ground anchor assembly at a job site; driving the ground anchor into the ground using a drive rod to impart percussion drive forces onto the ground anchor, with the attached cable tendon extending out of the ground; passing a proximal end of the cable tendon through any layers of ground reinforcement materials; threading the proximal end of the cable tendon through the top cap; positioning the top cap atop the ground with the cable grip portion oriented towards the ground; pushing the top cap into the ground until an underside of a load-bearing plate of the top cap presses against the ground; tensioning the cable tendon until the desired cable tension is reached which turns the ground anchor orthogonal to the cable tendon direction, thereby mounting a resistance to pullout and setting the ground anchor in the ground; and, securing the cable tendon.

In an embodiment of the invention, the driving is achieved by inserting a rod tip of the drive rod into a driving hole in a driving end of the ground anchor.

In an embodiment of the invention, the driving is achieved by applying the percussive force to a flat portion of the driving end of the ground anchor.

In an embodiment of the invention, securing comprises locking the proximal end of the cable tendon to the top cap using the cable grip mechanism of the cable grip portion.

In an embodiment of the invention, the method further comprises cutting off excess cable tendon after the locking.

In an embodiment of the invention, securing comprises fastening the proximal end of the cable tendon to an object to be supported and/or stabilized.

There is further provided in accordance with an aspect of the invention, an anchor reinforced vegetation system, comprising: a plurality of ground anchor assemblies; and, a high-performance turf reinforcement mat through which the plurality of ground anchor assemblies is inserted positioning the high-performance turf reinforcement mat between the top caps of the ground anchor assemblies and the ground.

BRIEF DESCRIPTION OF DRAWINGS

Figure 1:
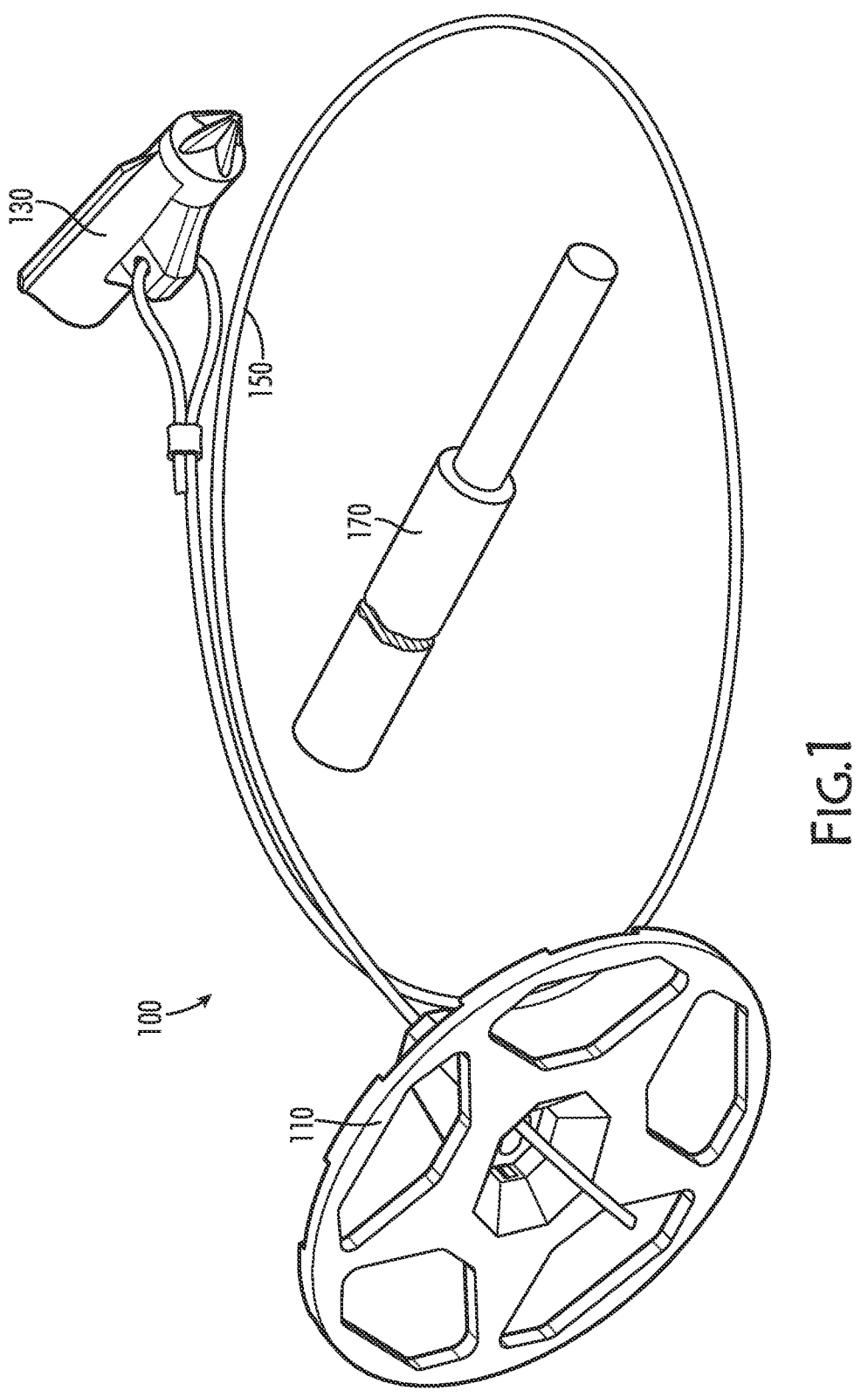
Figure 2:
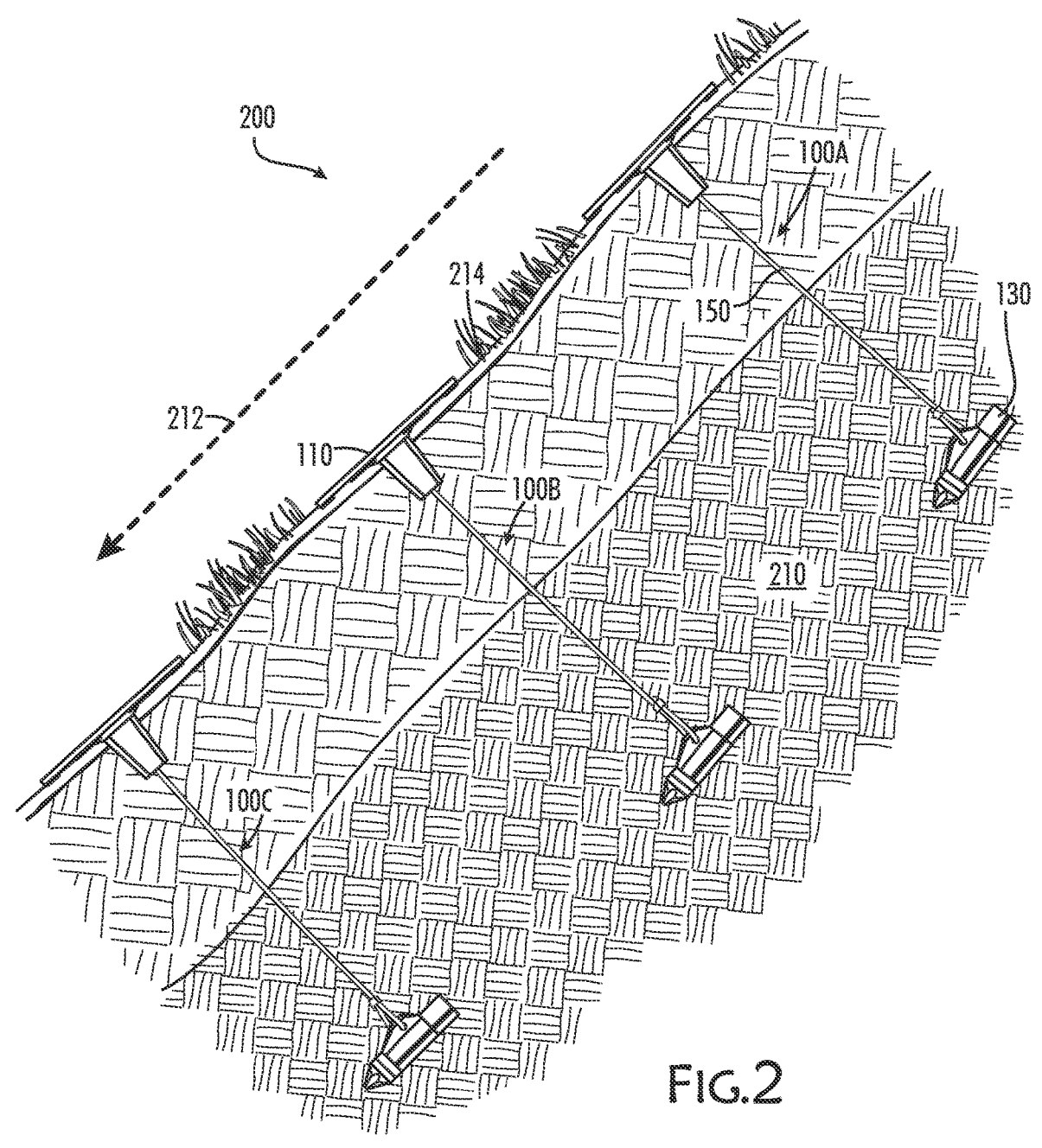
Figures 3A, 3B:
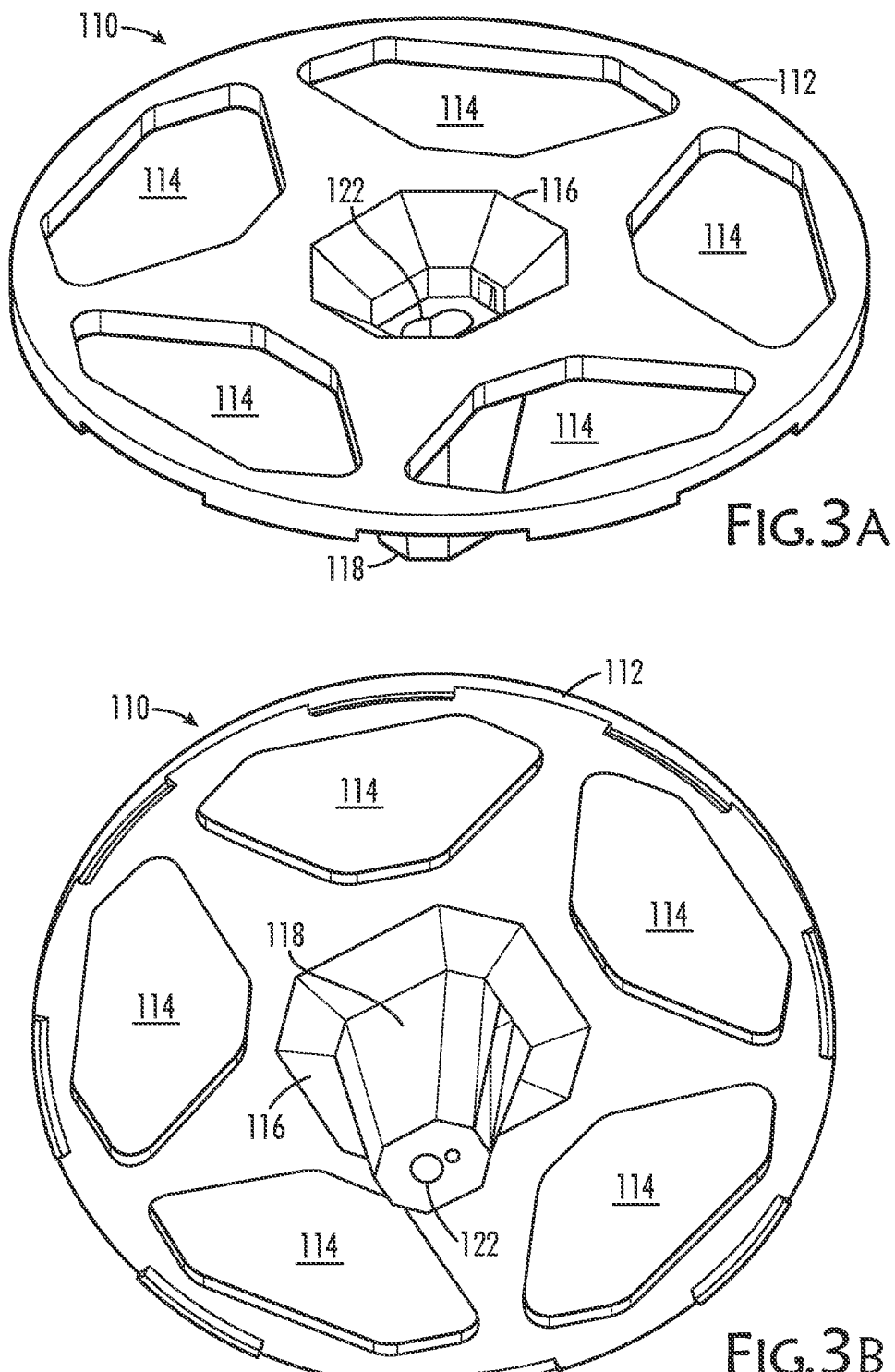
Figure 4:
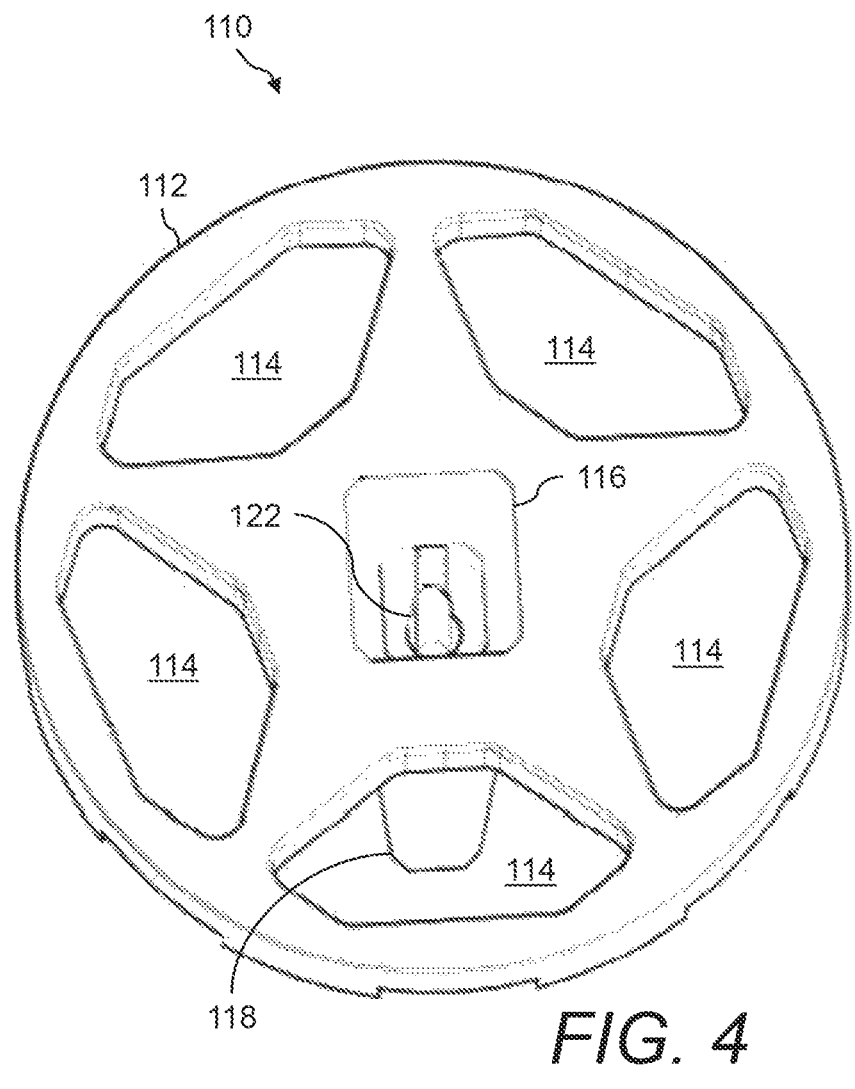
Figure 5:
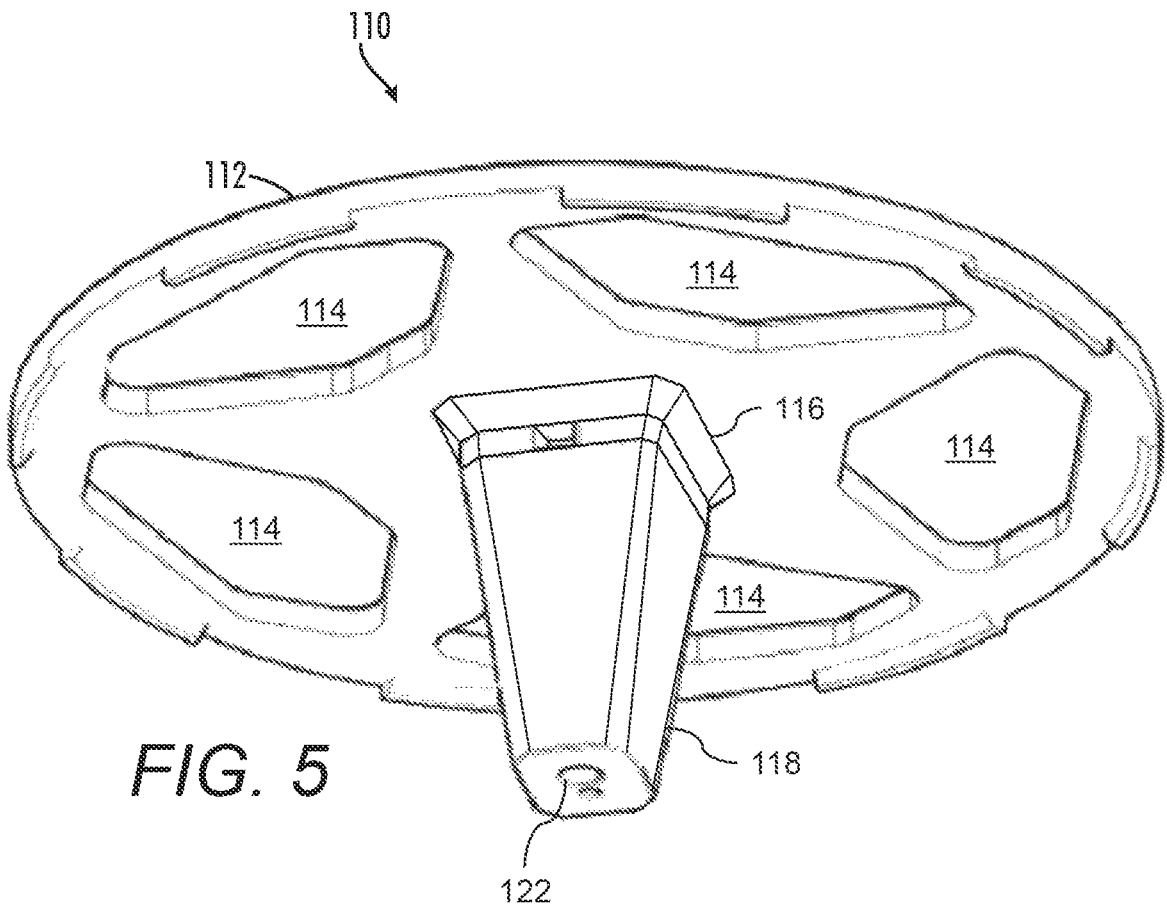
Figure 6:
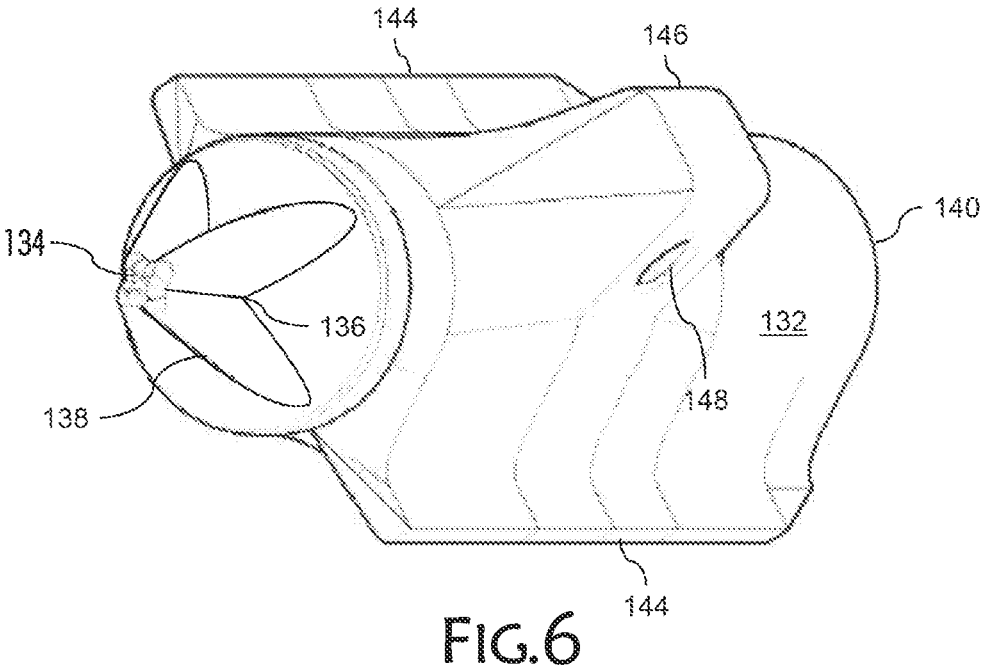
Figure 7:
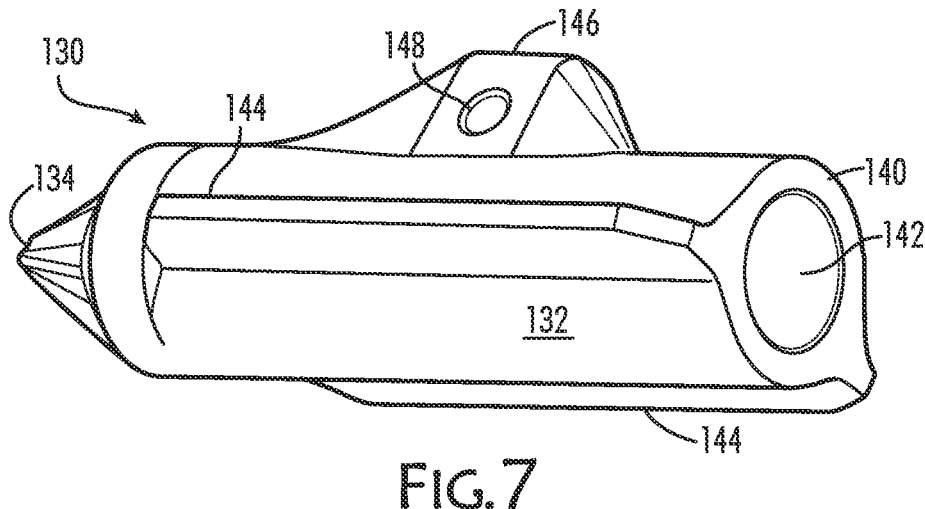
Figure 8A:
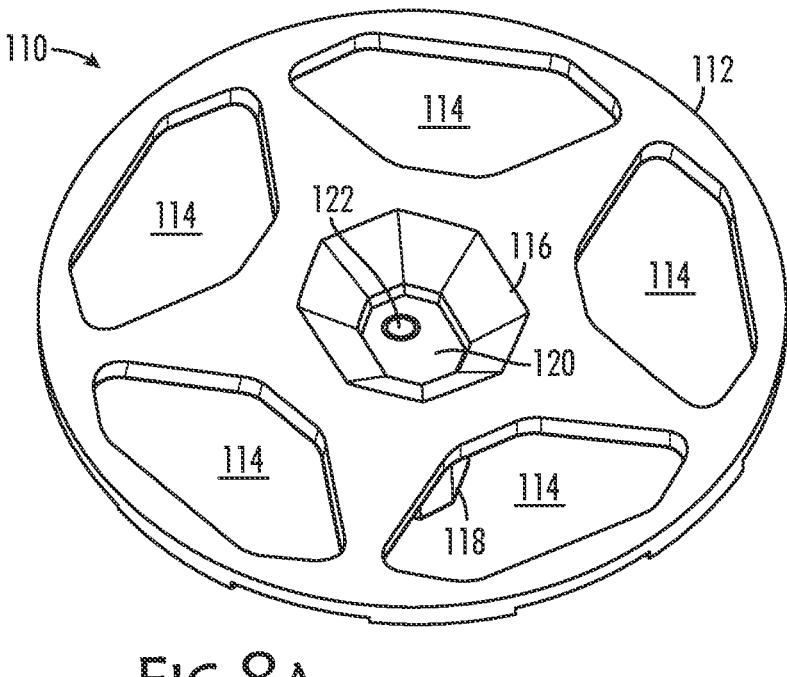
Figure 8B:
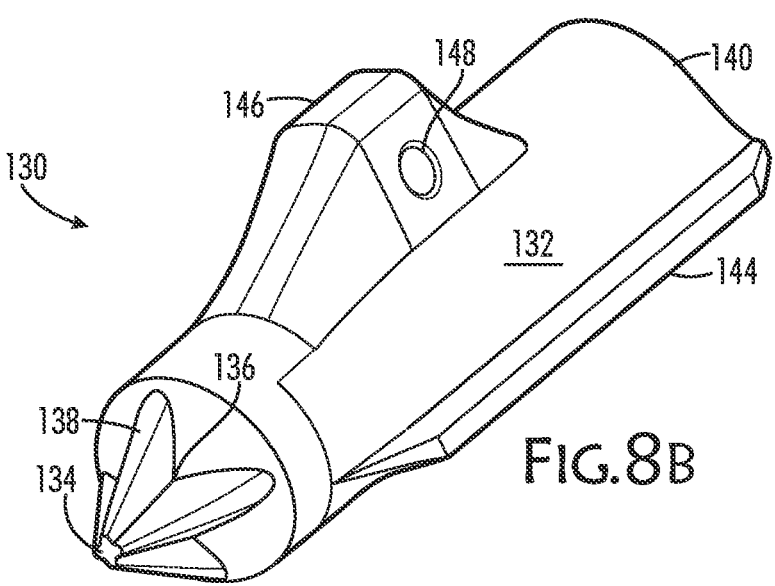
Figure 9:
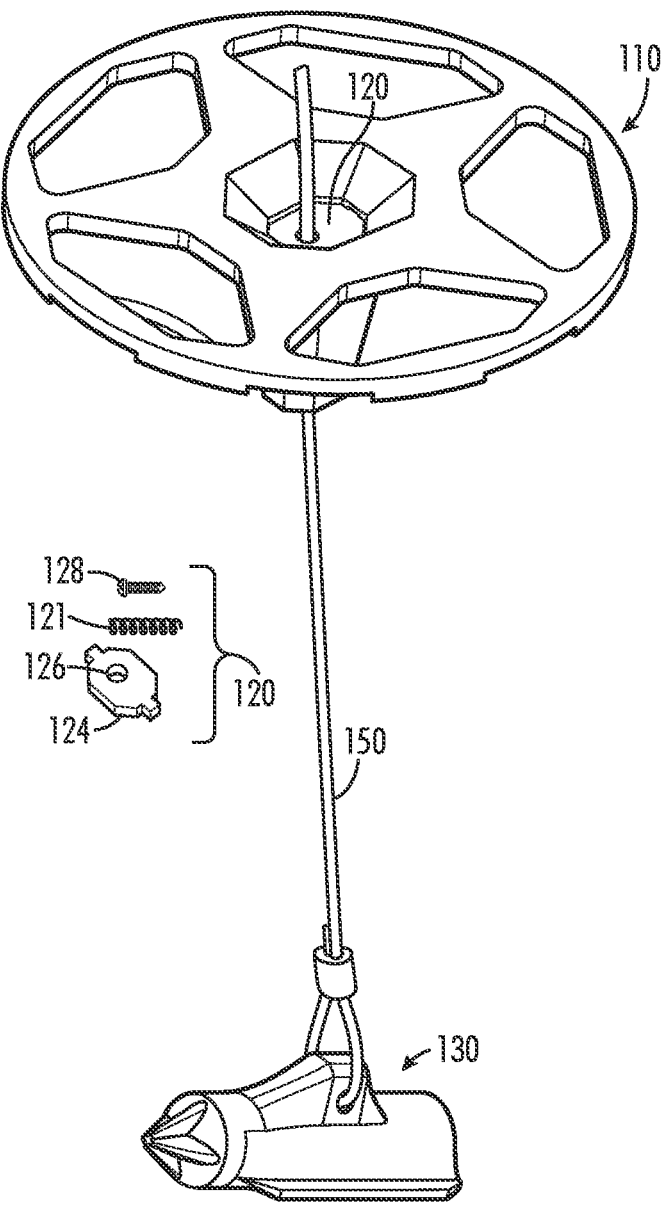
Figure 10:
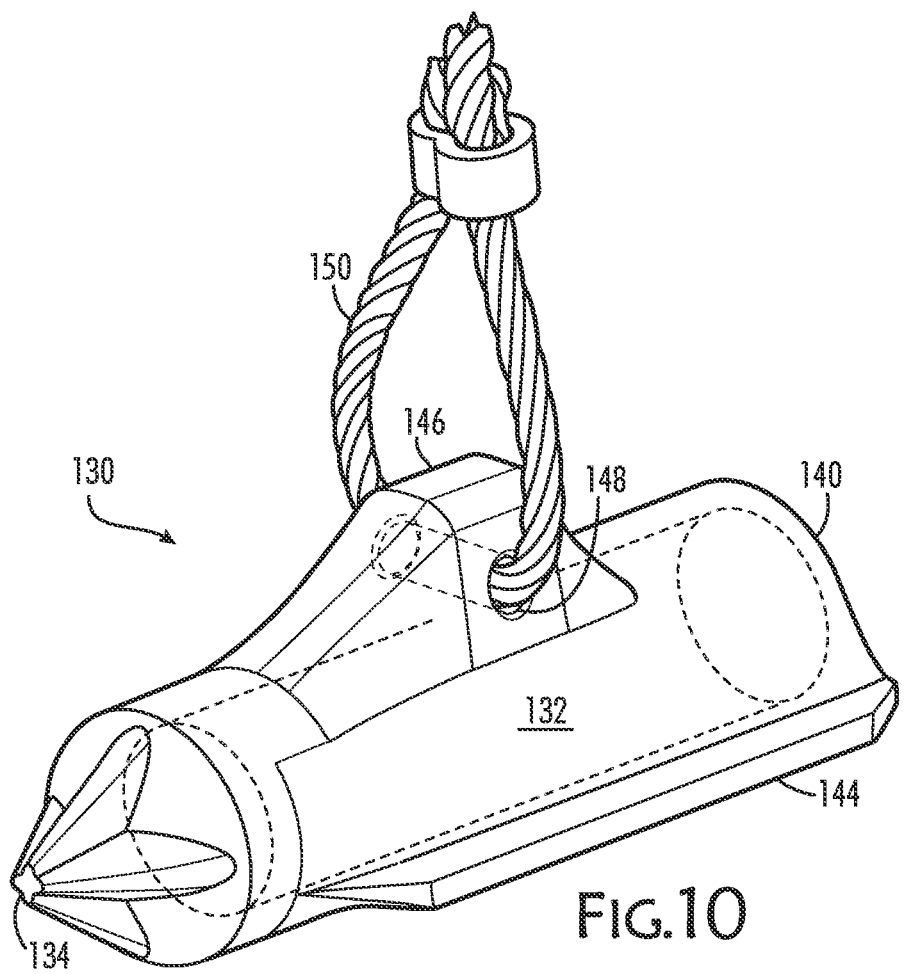
Figure 11:
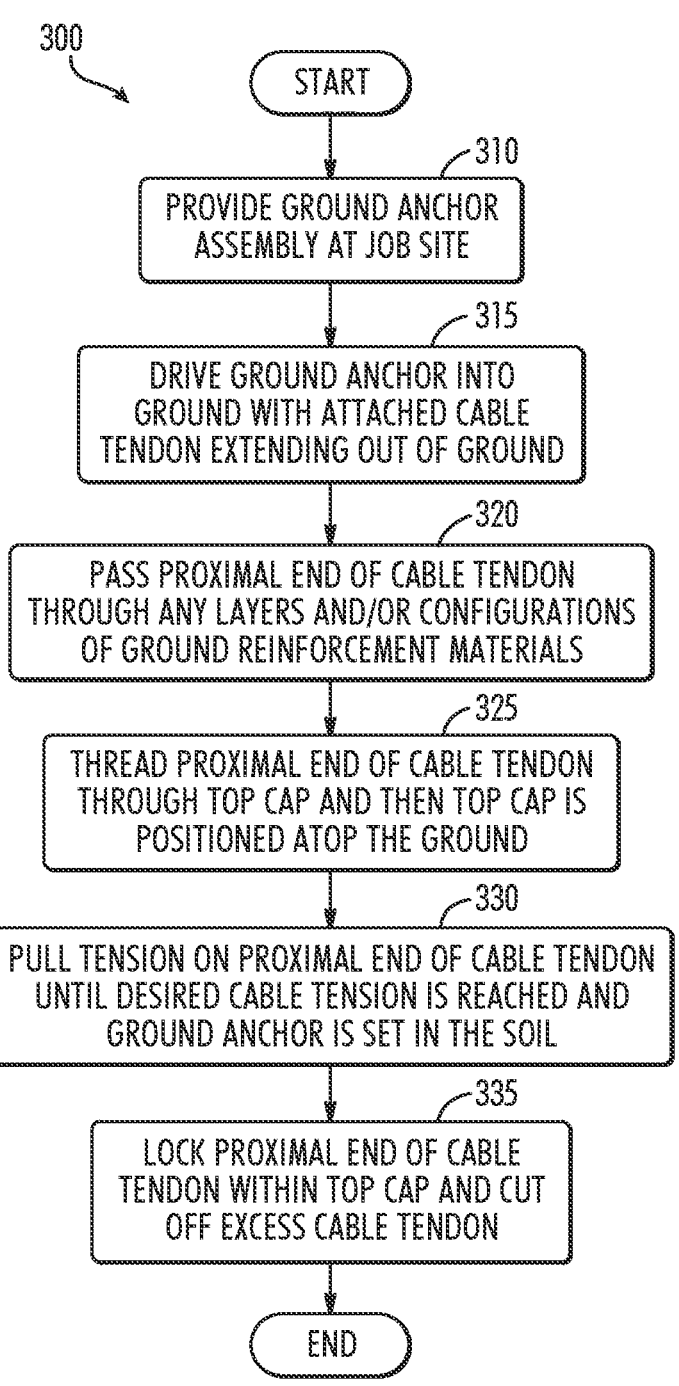
Figures 12A, 12B:
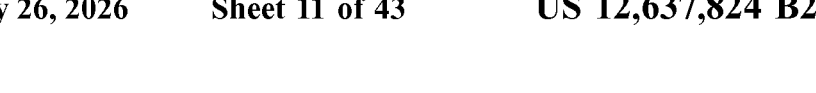
Figure 13A:
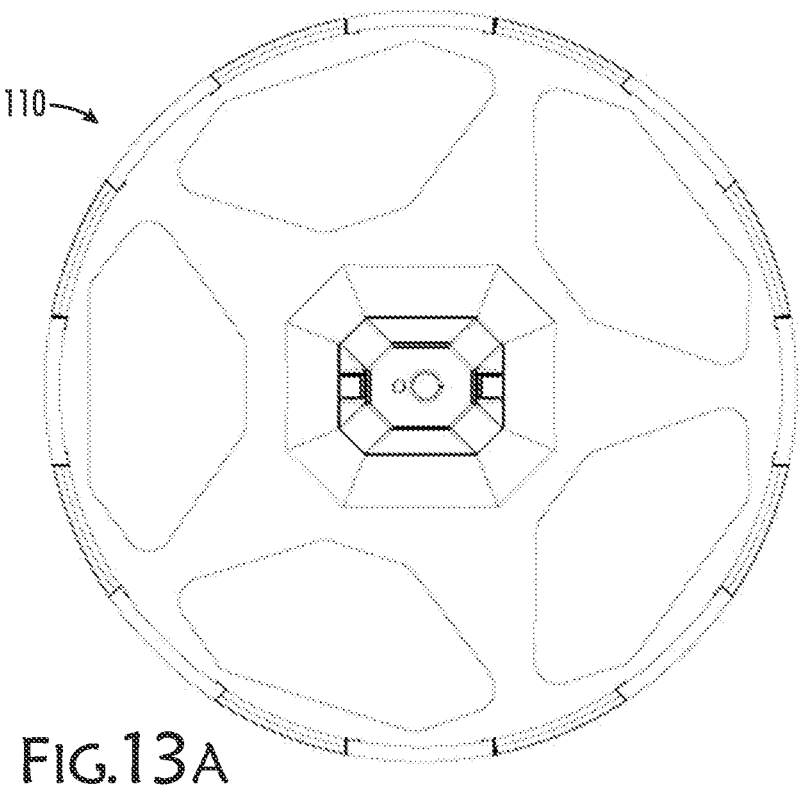
Figure 13B:
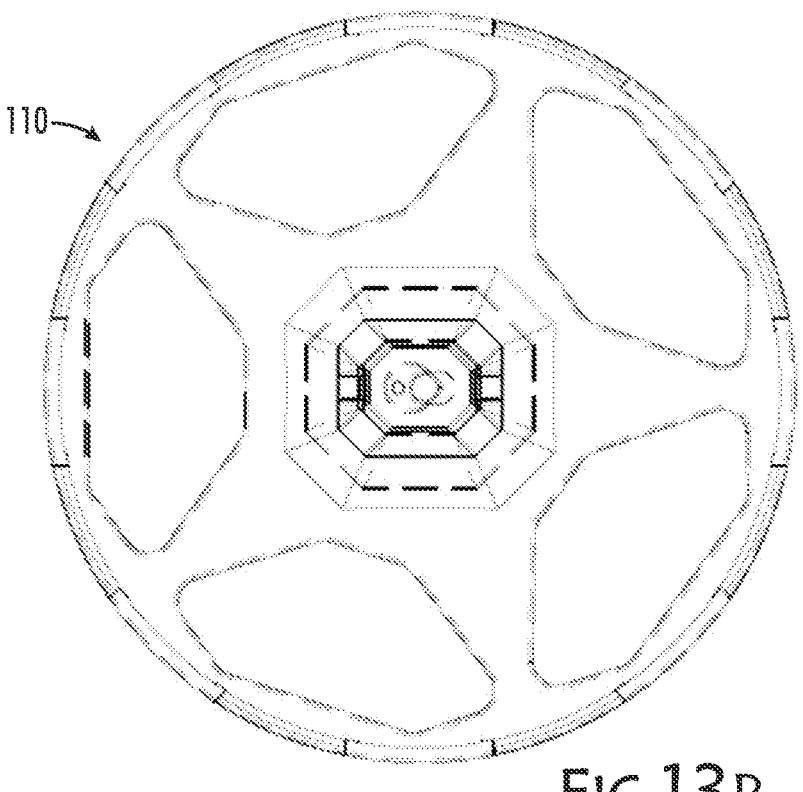
Figure 14A:
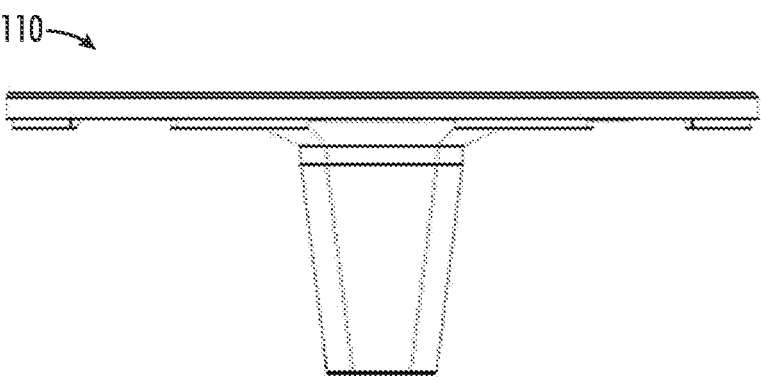
Figure 14B:
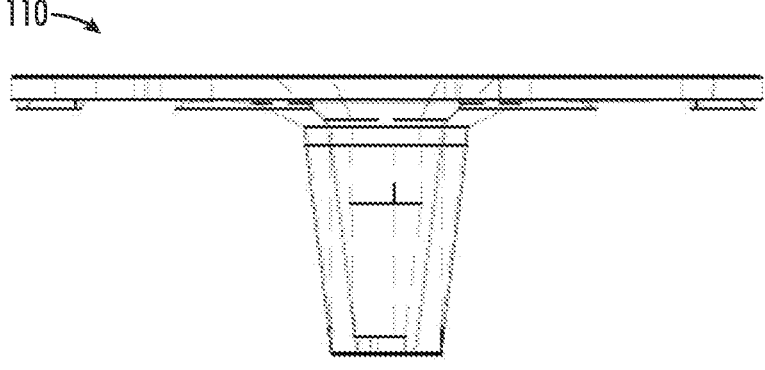
Figure 15A:
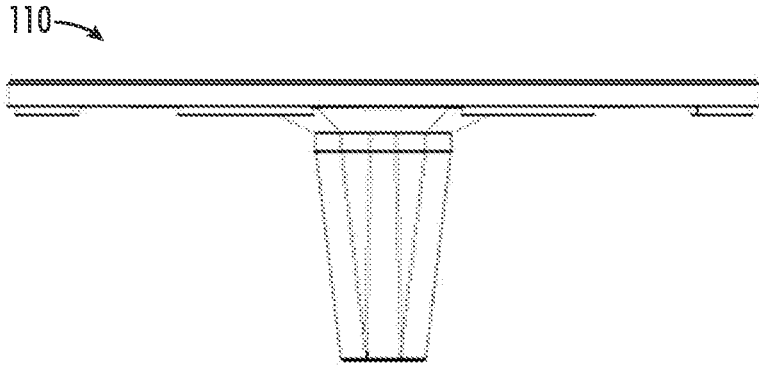
Figure 15B:
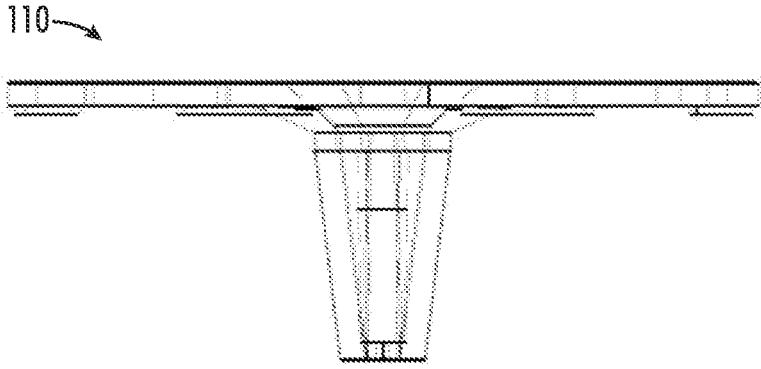
Figure 16:
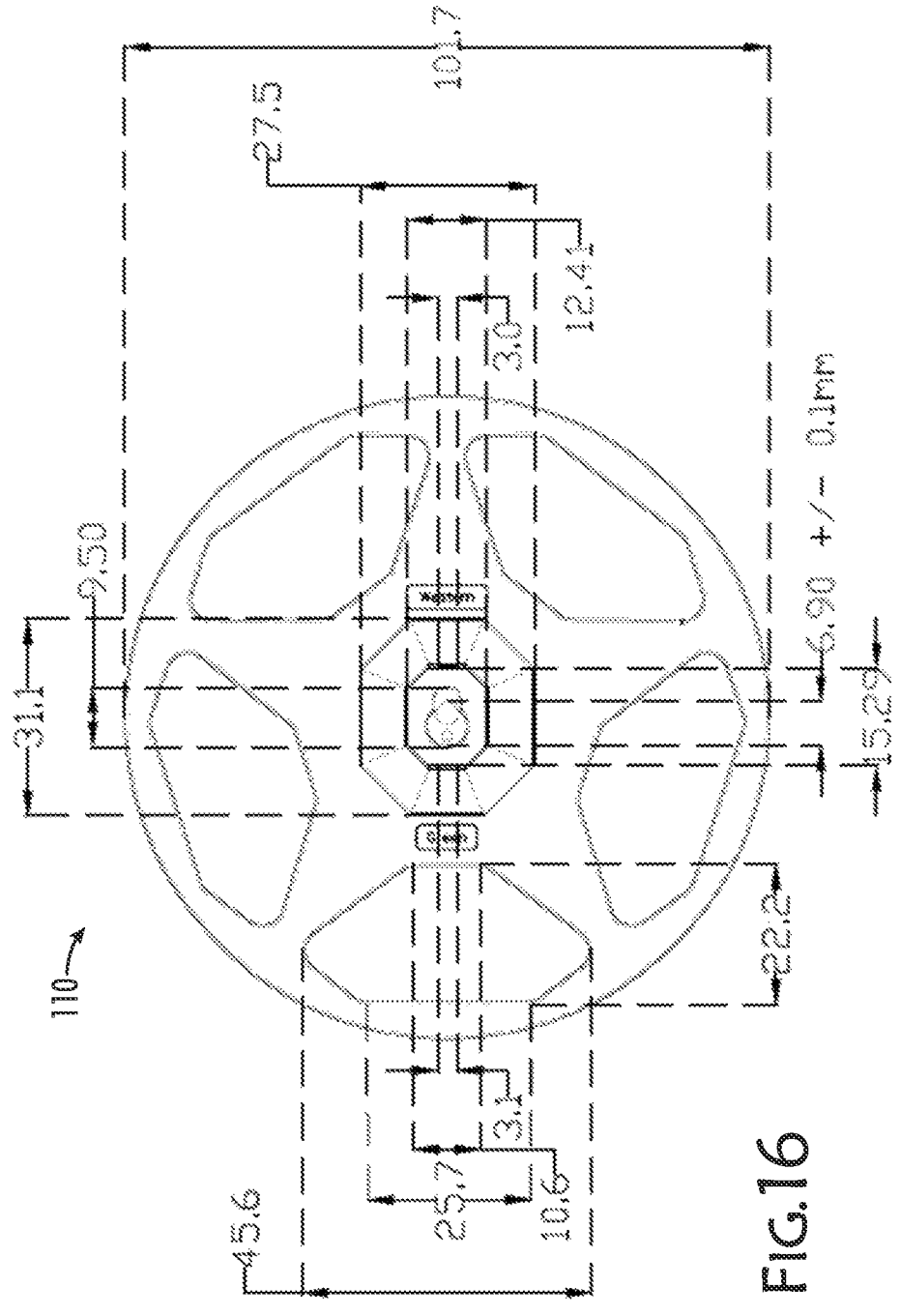
Figure 17:
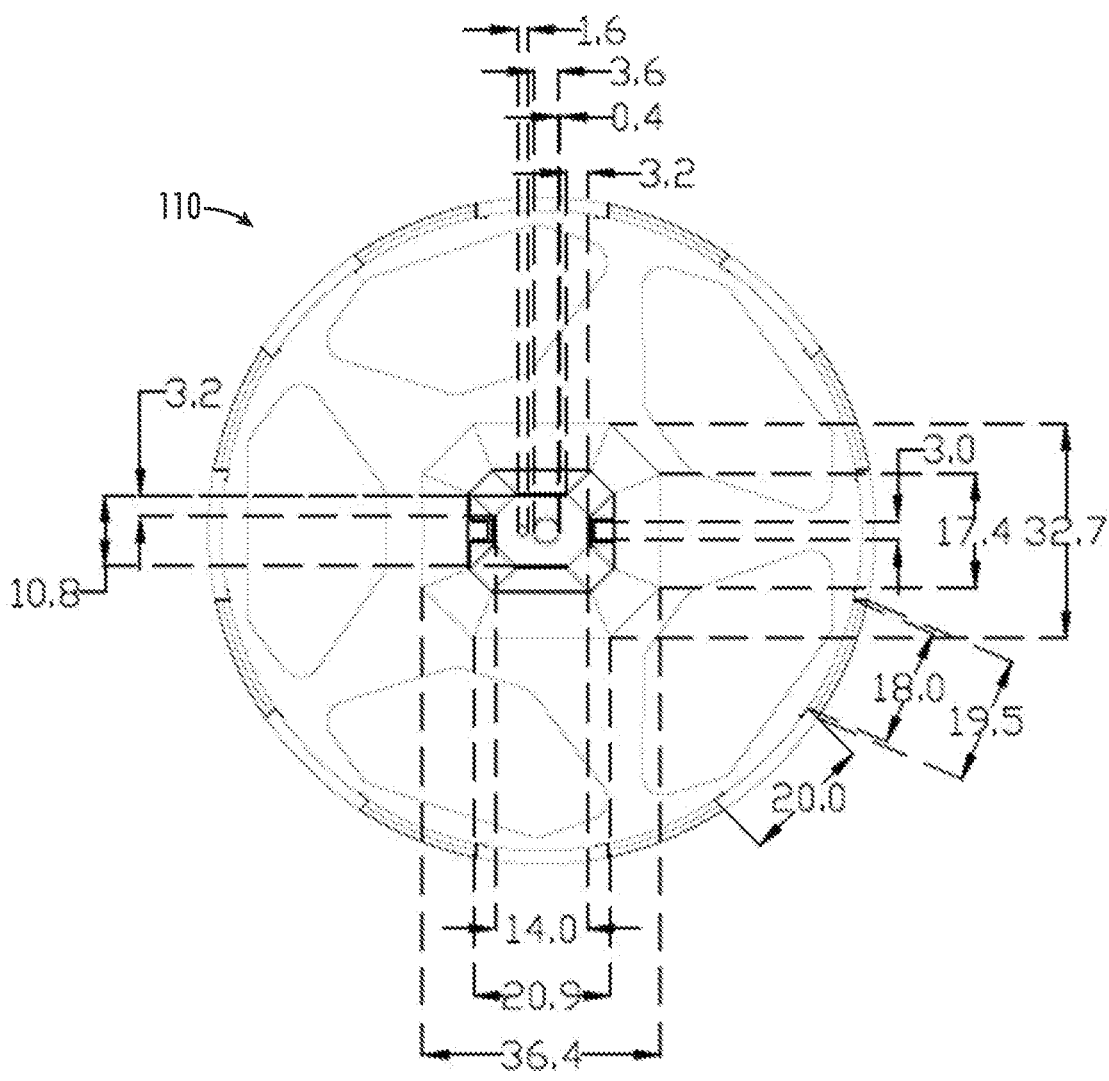
Figure 18A:
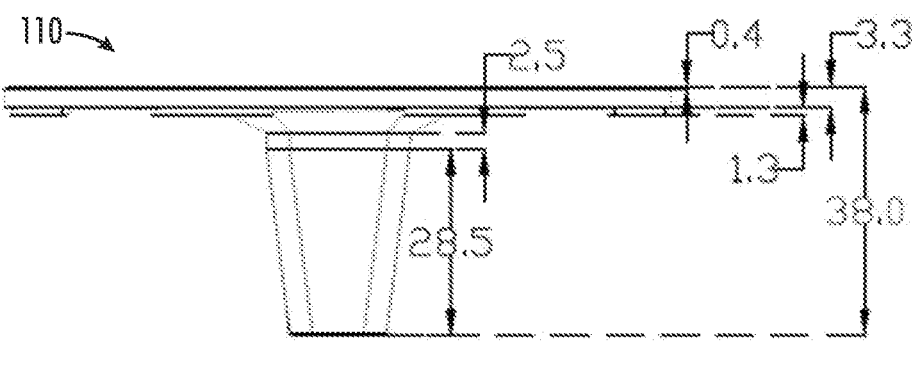
Figure 18B:
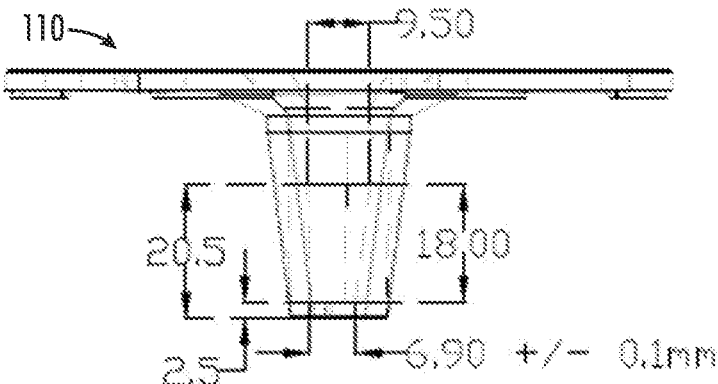
Figure 18C:
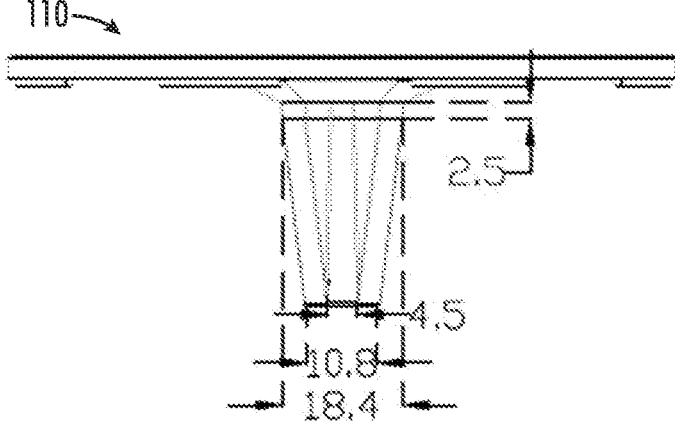
Figure 19A:
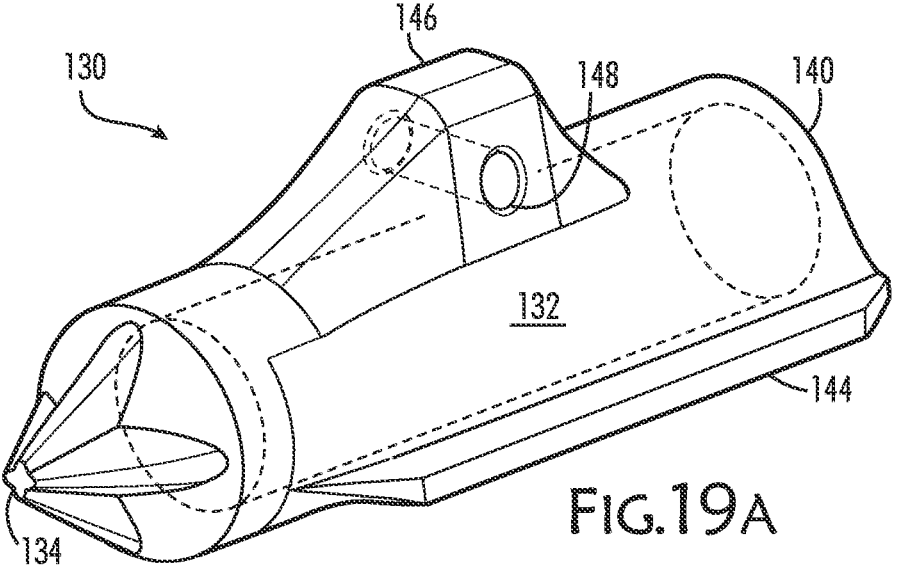
Figure 19B:
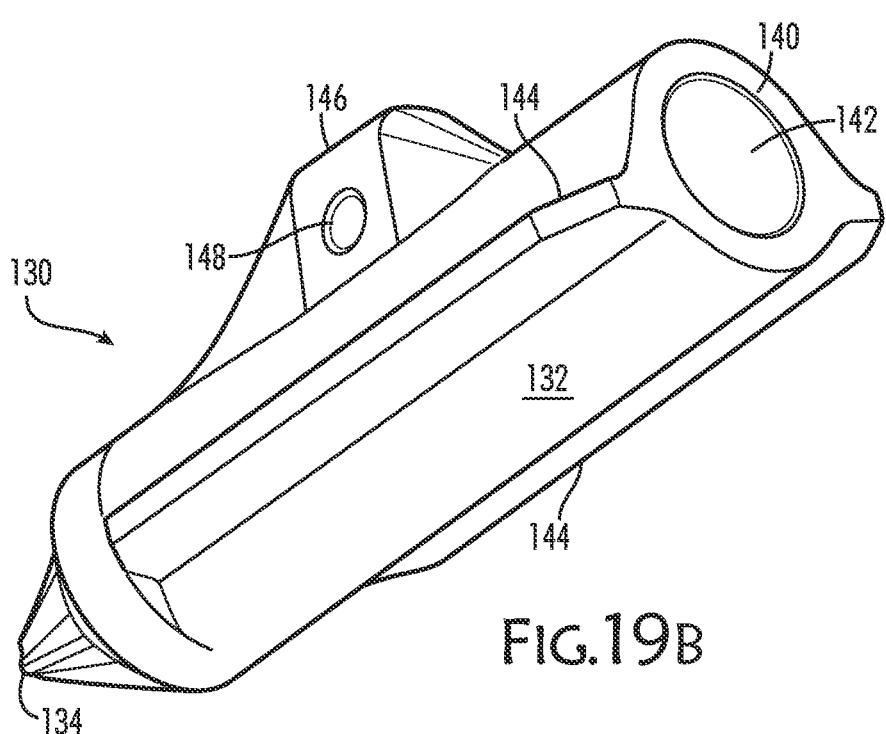
Figures 20A, 20B, 20C, 20D:
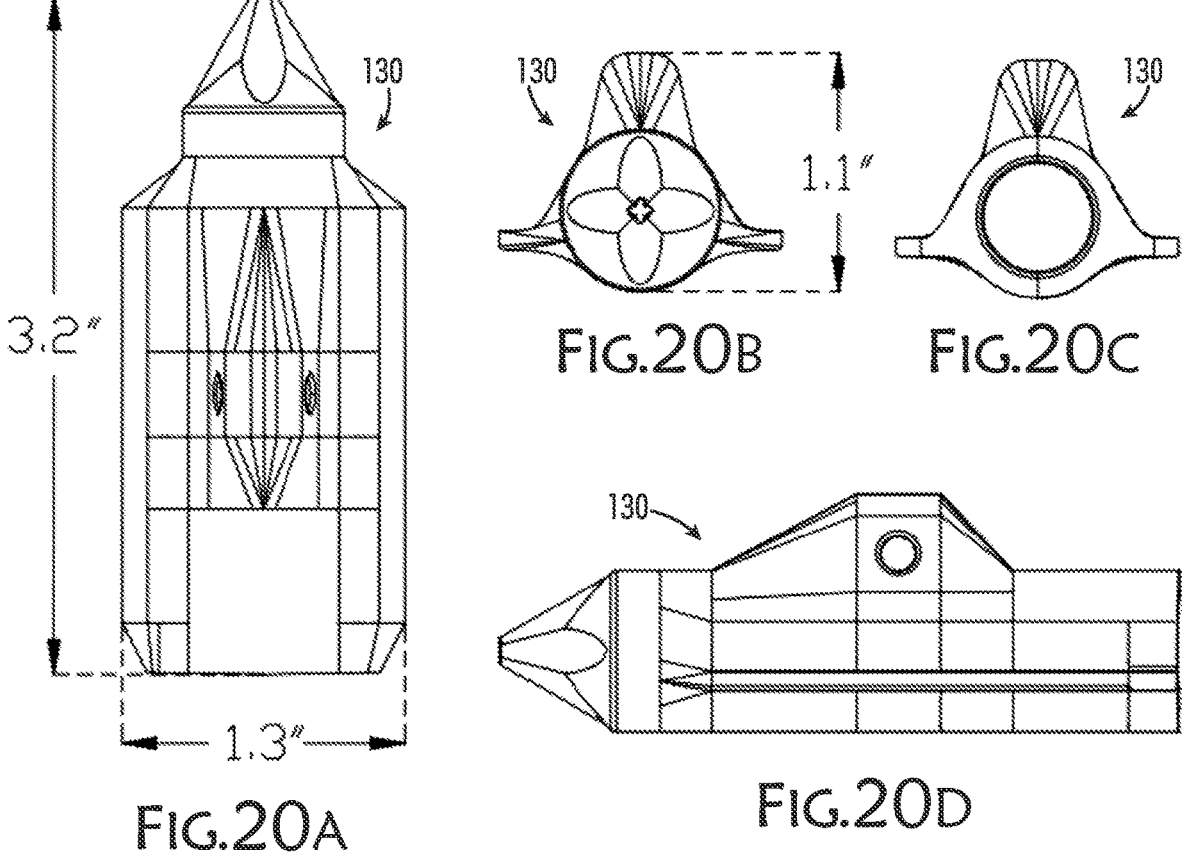
Figure 21A:
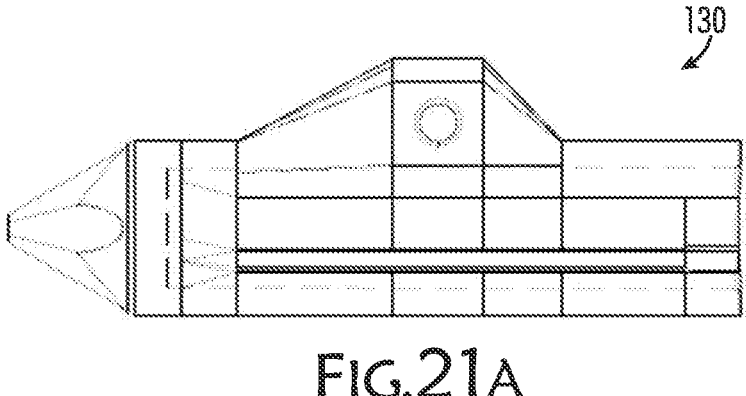
Figure 21B:
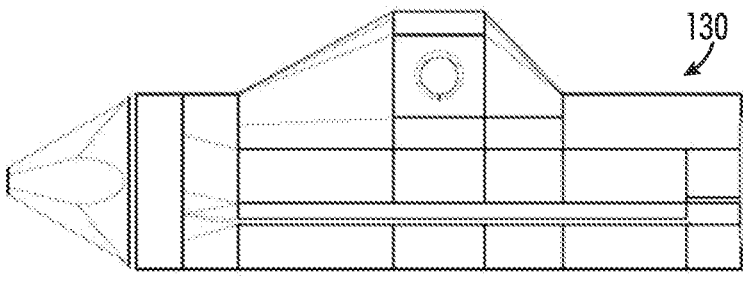
Figures 22A, 22B:
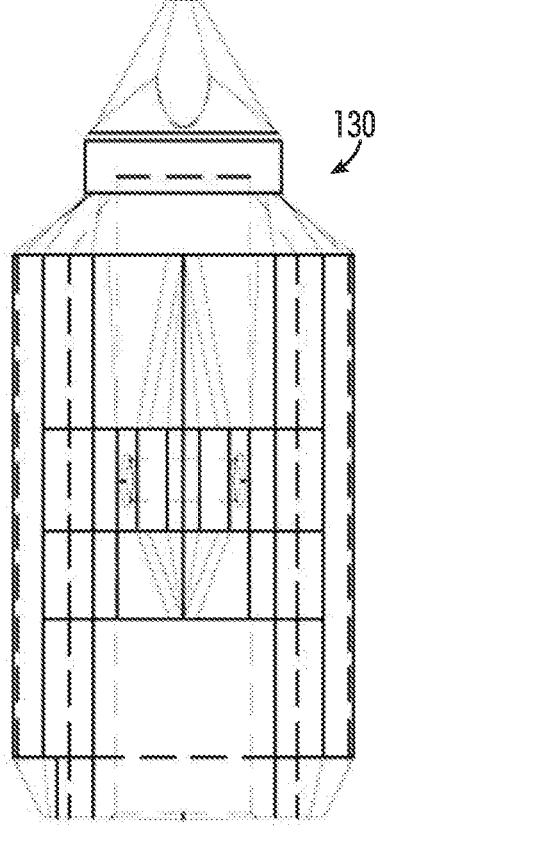
Figures 23A, 23B:
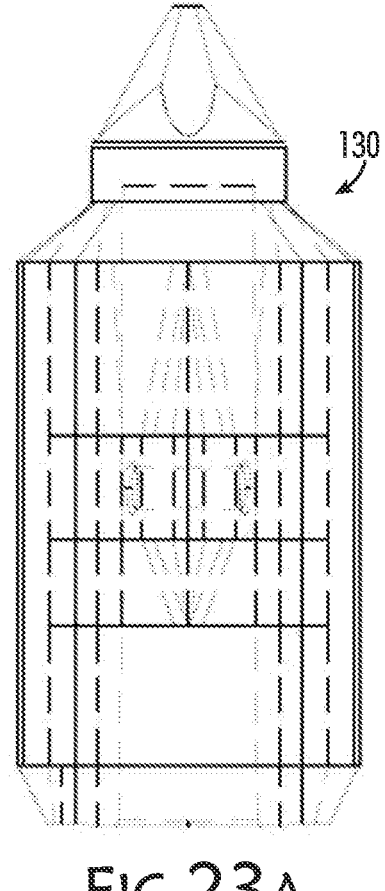
Figure 24A:
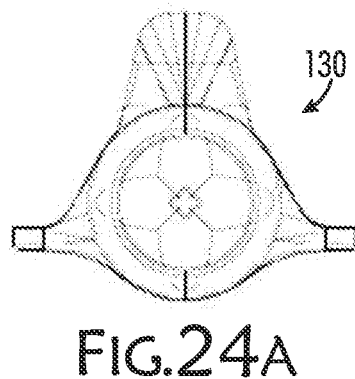
Figure 24B:
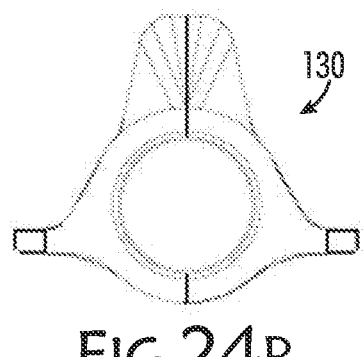
Figure 24C:
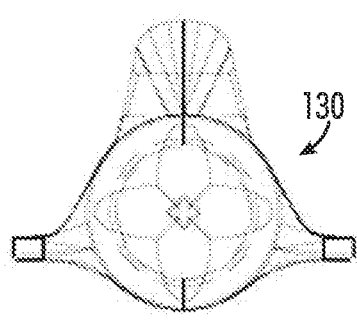
Figure 24C:
Figure 24D:
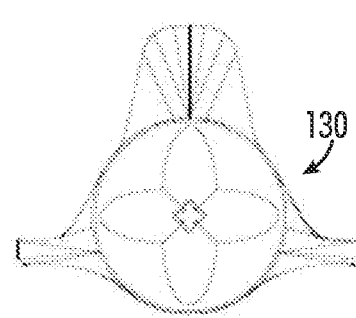
Figure 25:
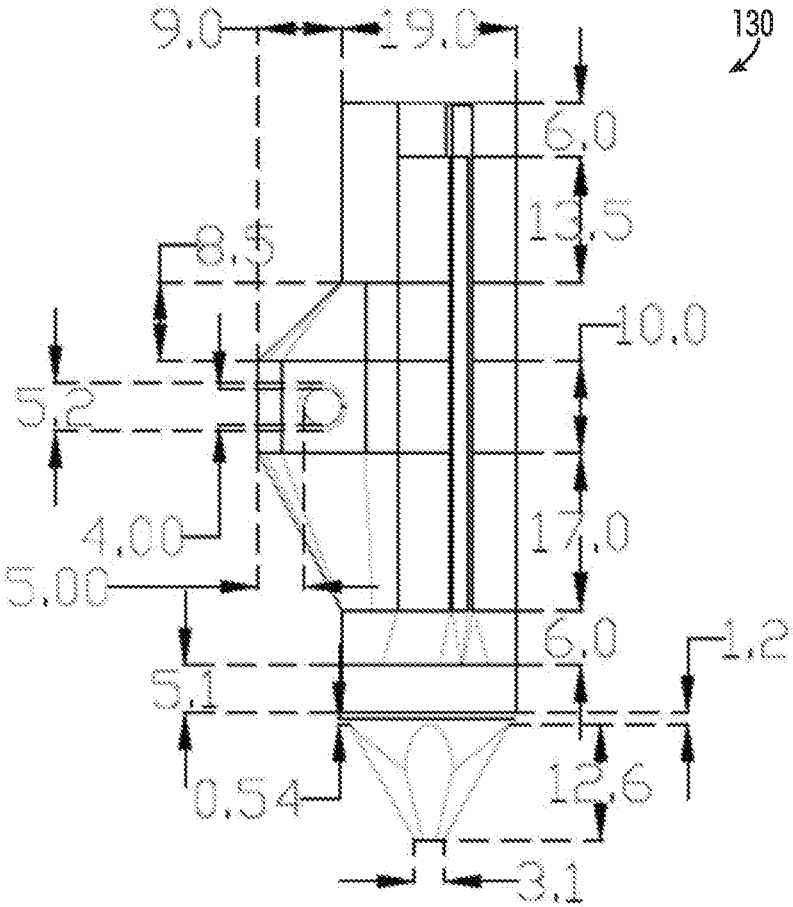
Figure 26:
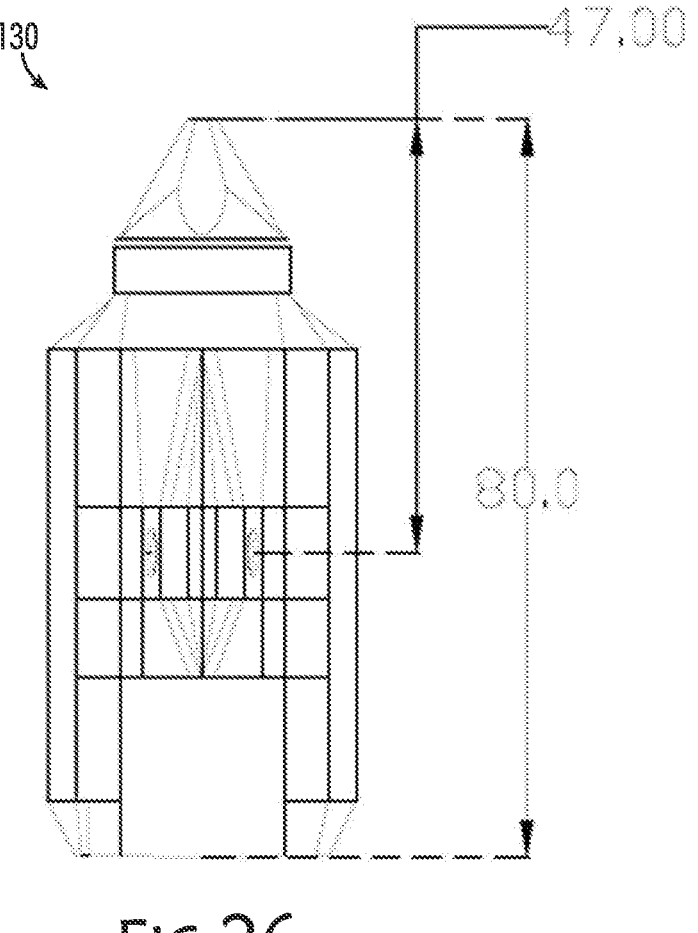
Figure 27:
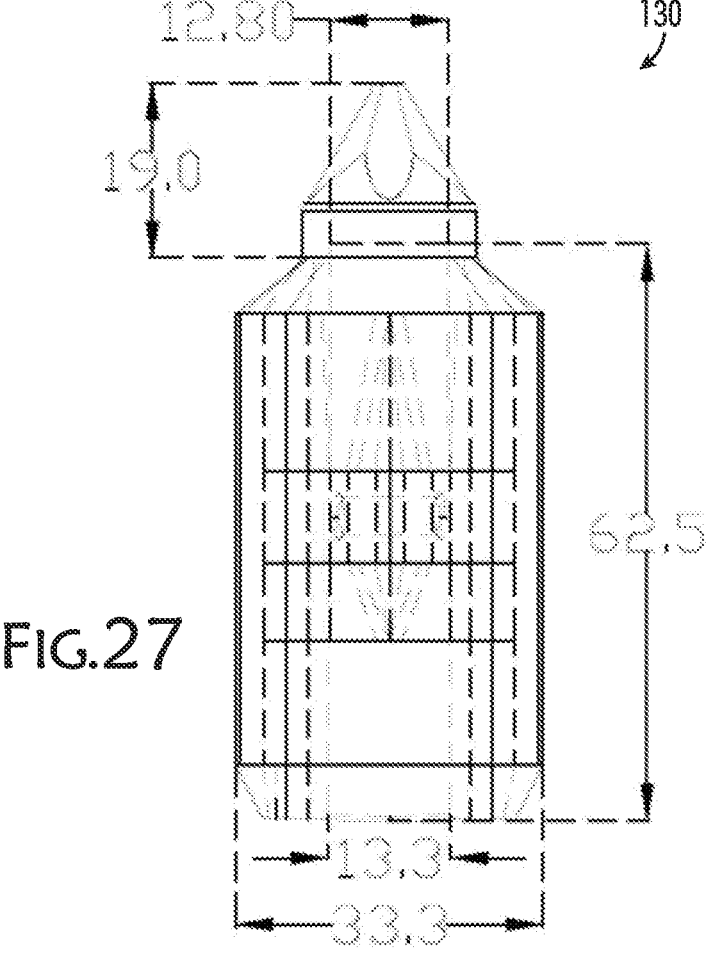
Figure 29A:
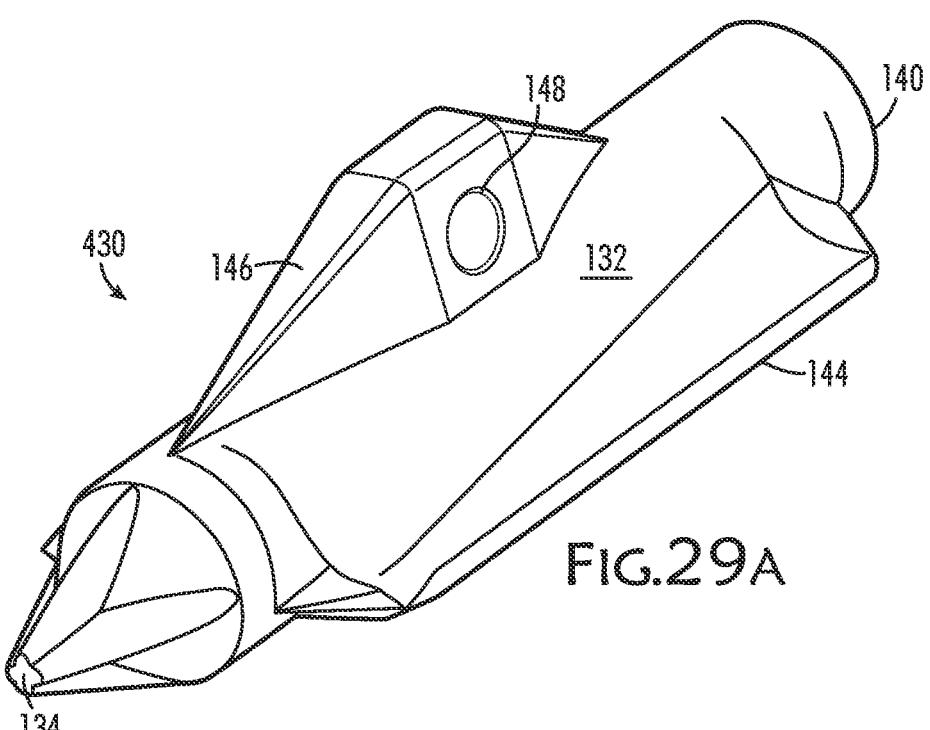
Figure 29B:
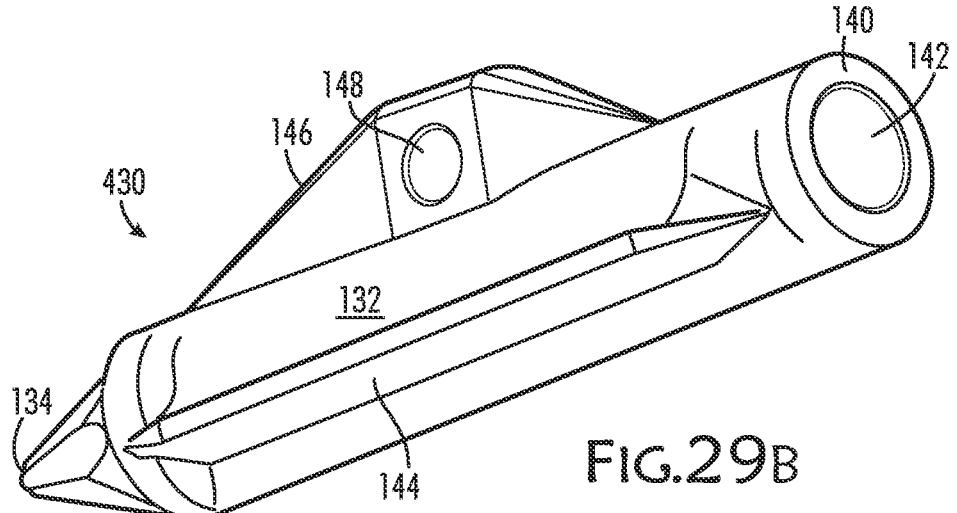
Figures 30A, 30B, 30C, 30D:
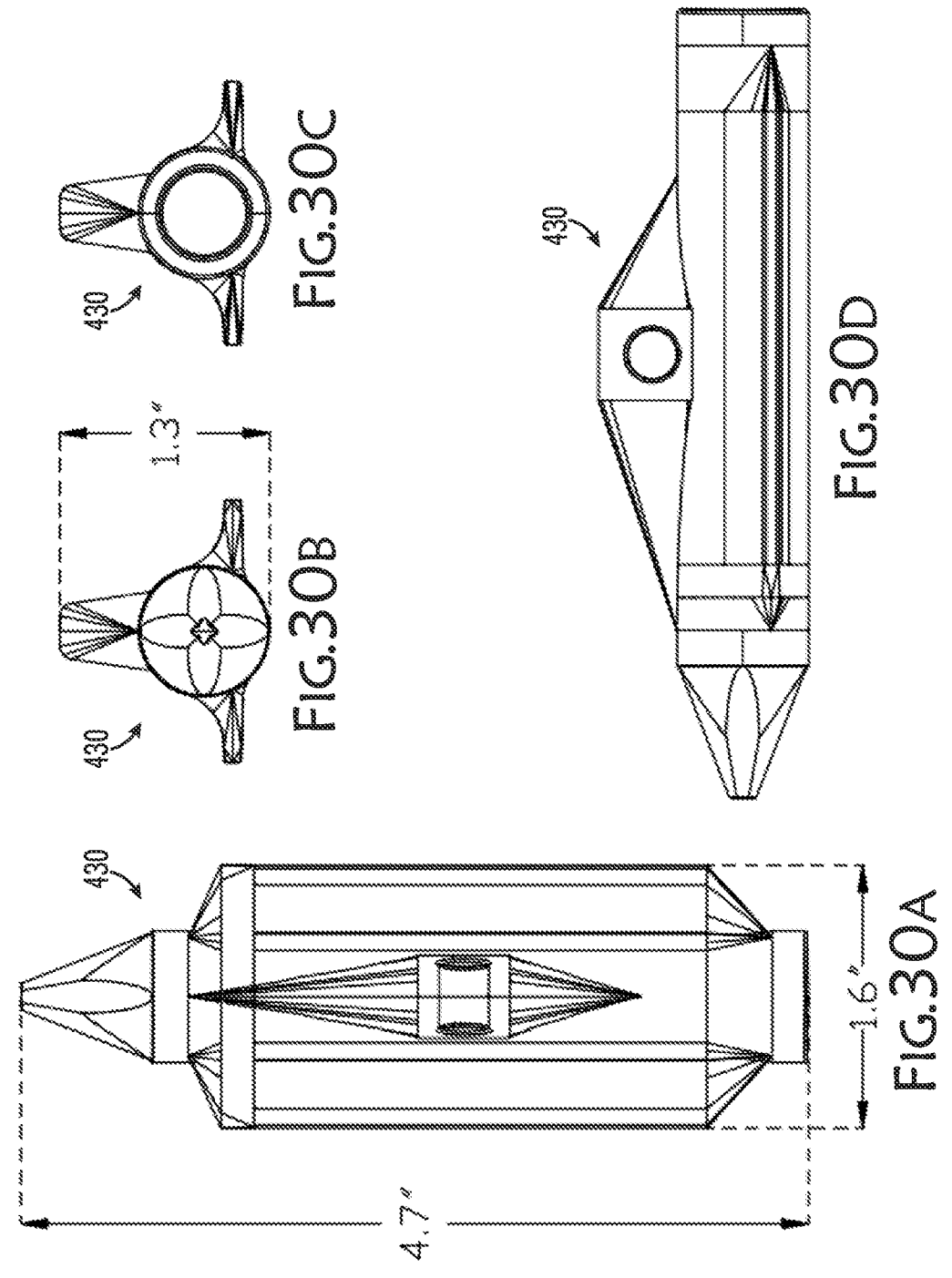
Figure 31A:
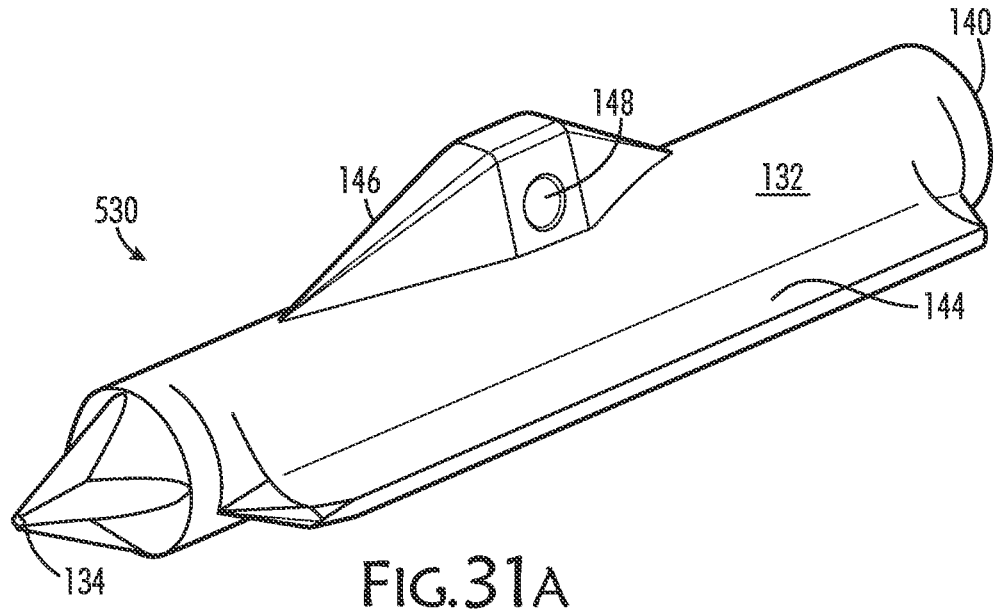
Figure 31B:
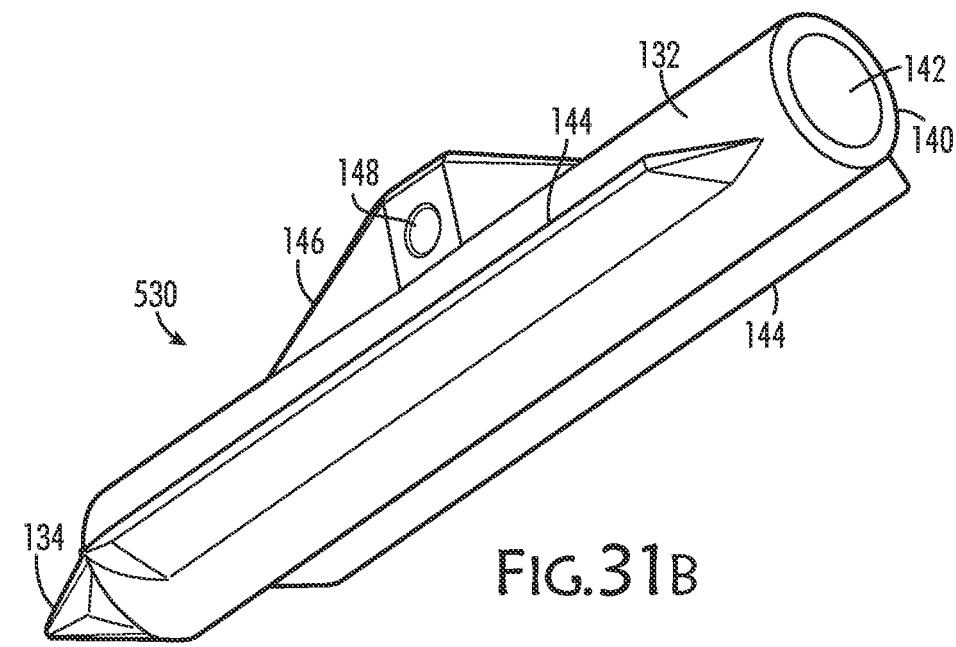
Figures 32A, 32B, 32C, 32D:
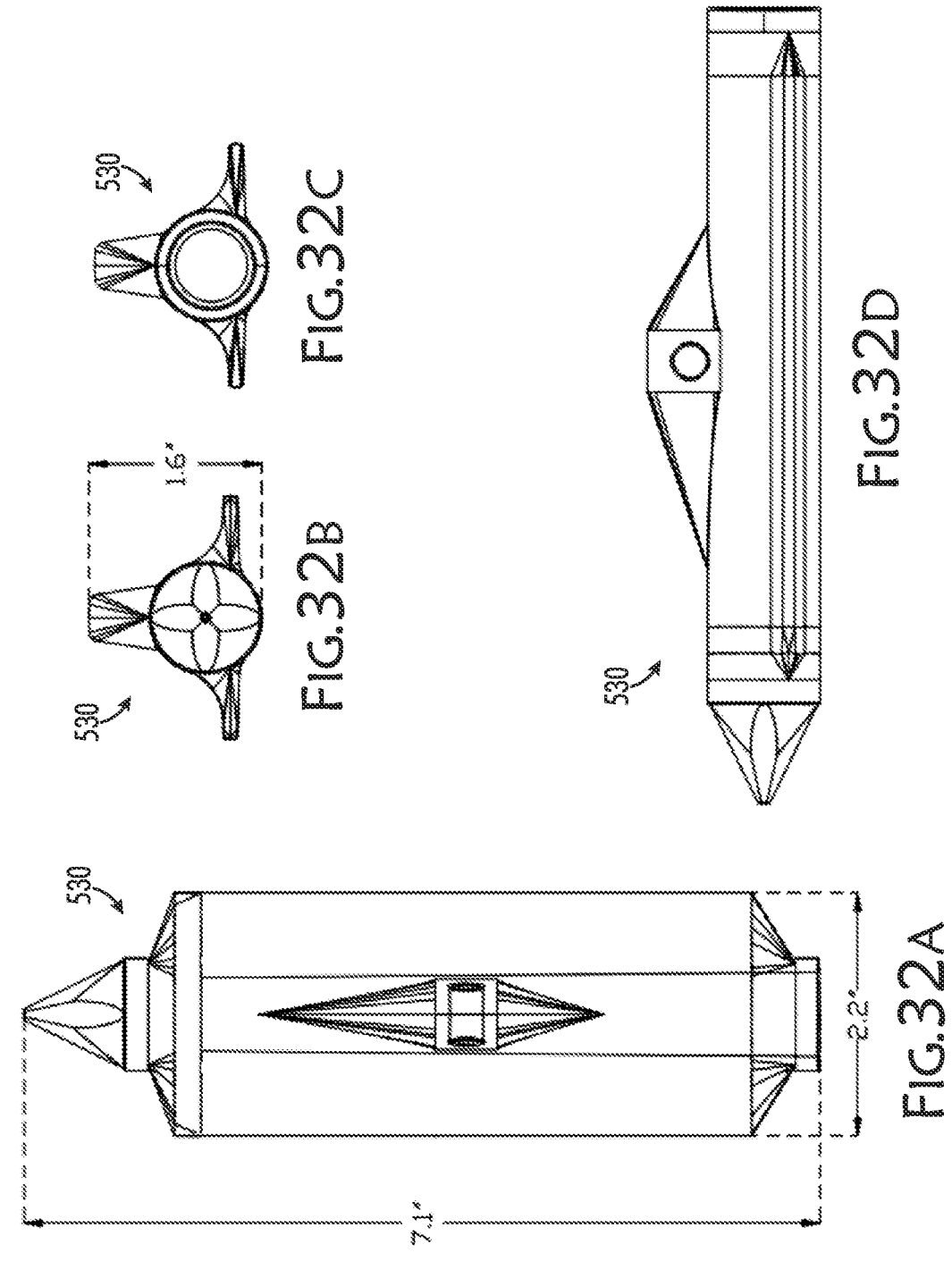
Figures 33A, 33B, 33C, 33D:
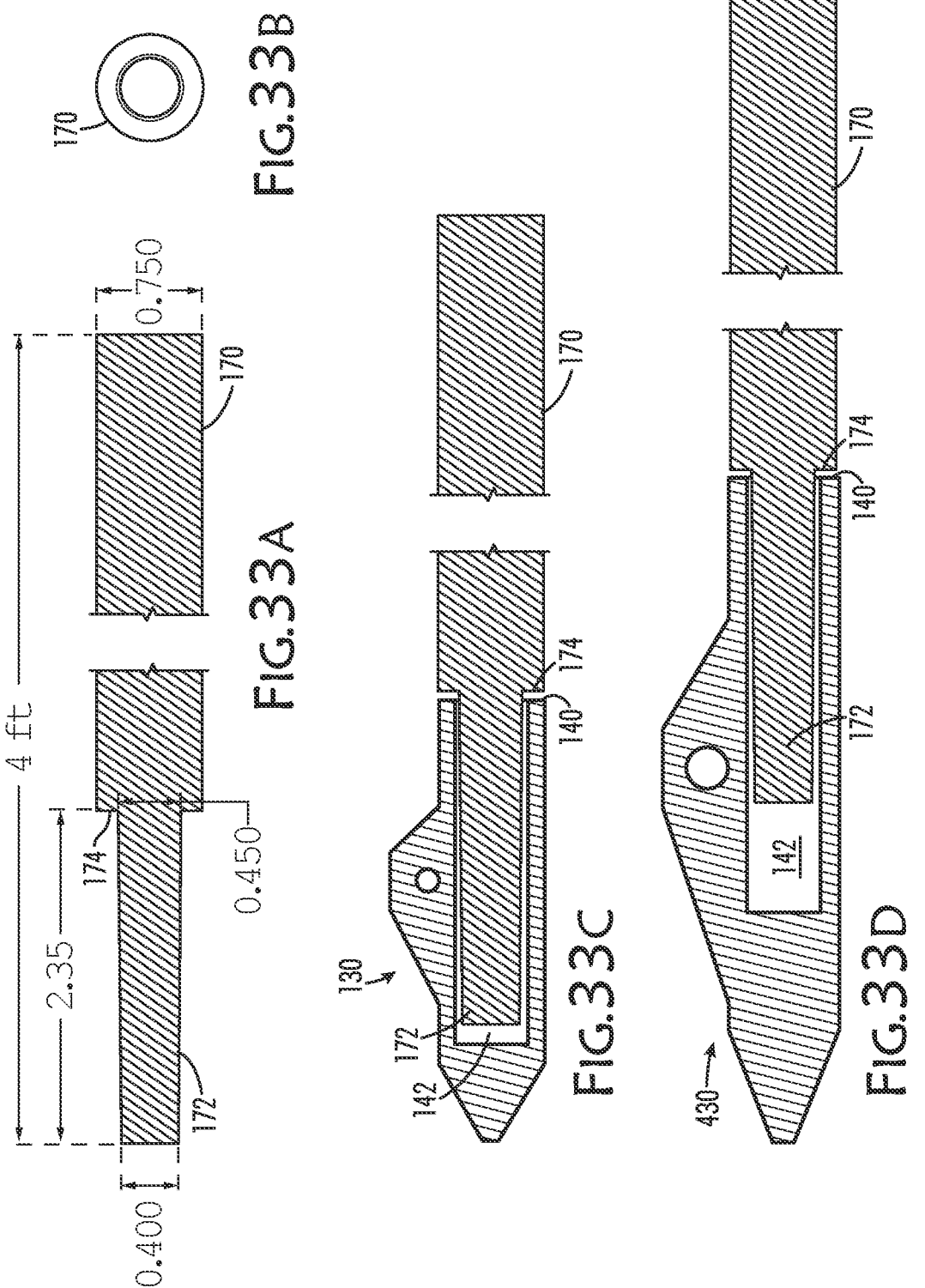
Figures 34A, 34C, 34D:
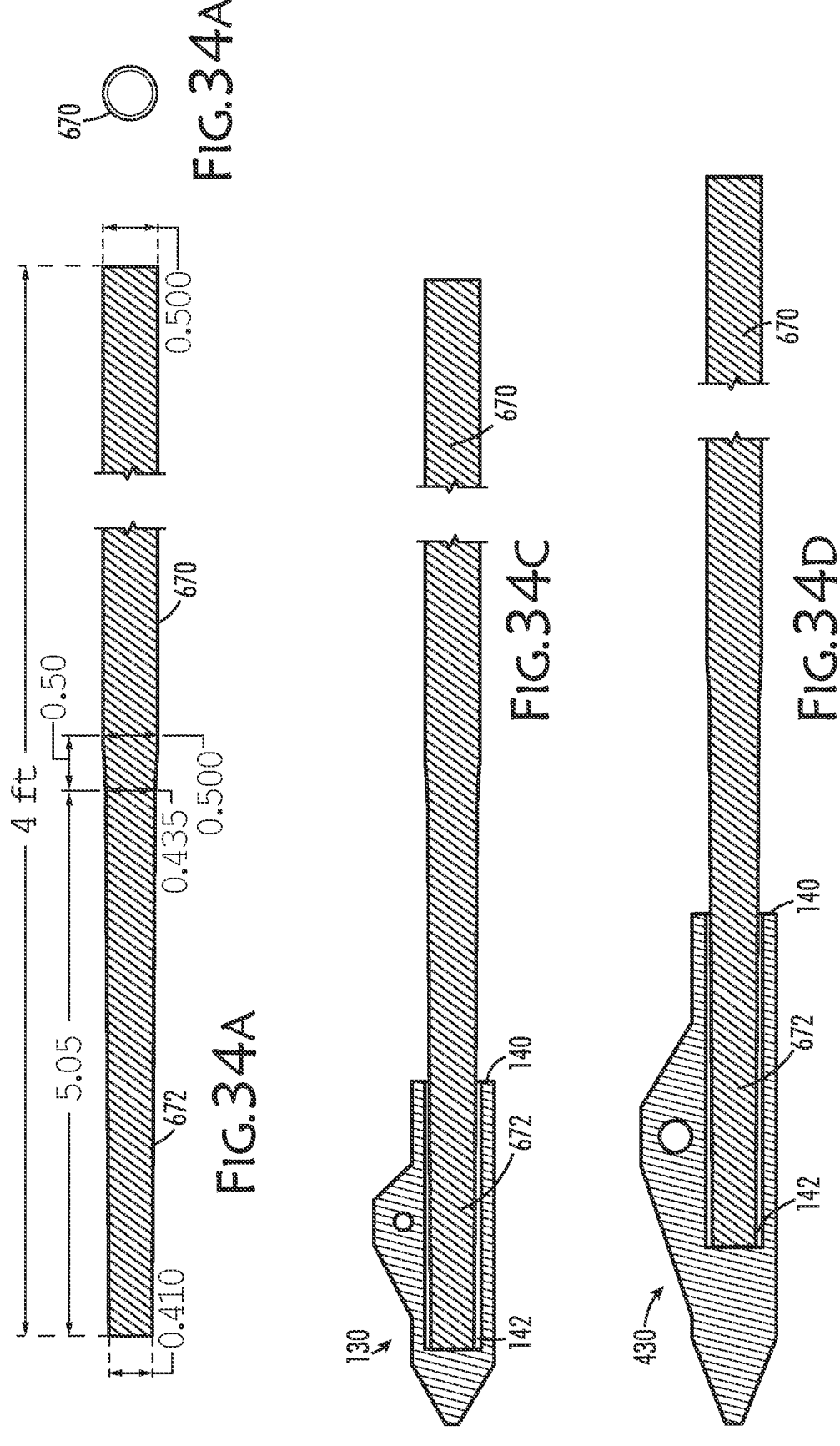
Figures 35A, 35B, 35C:
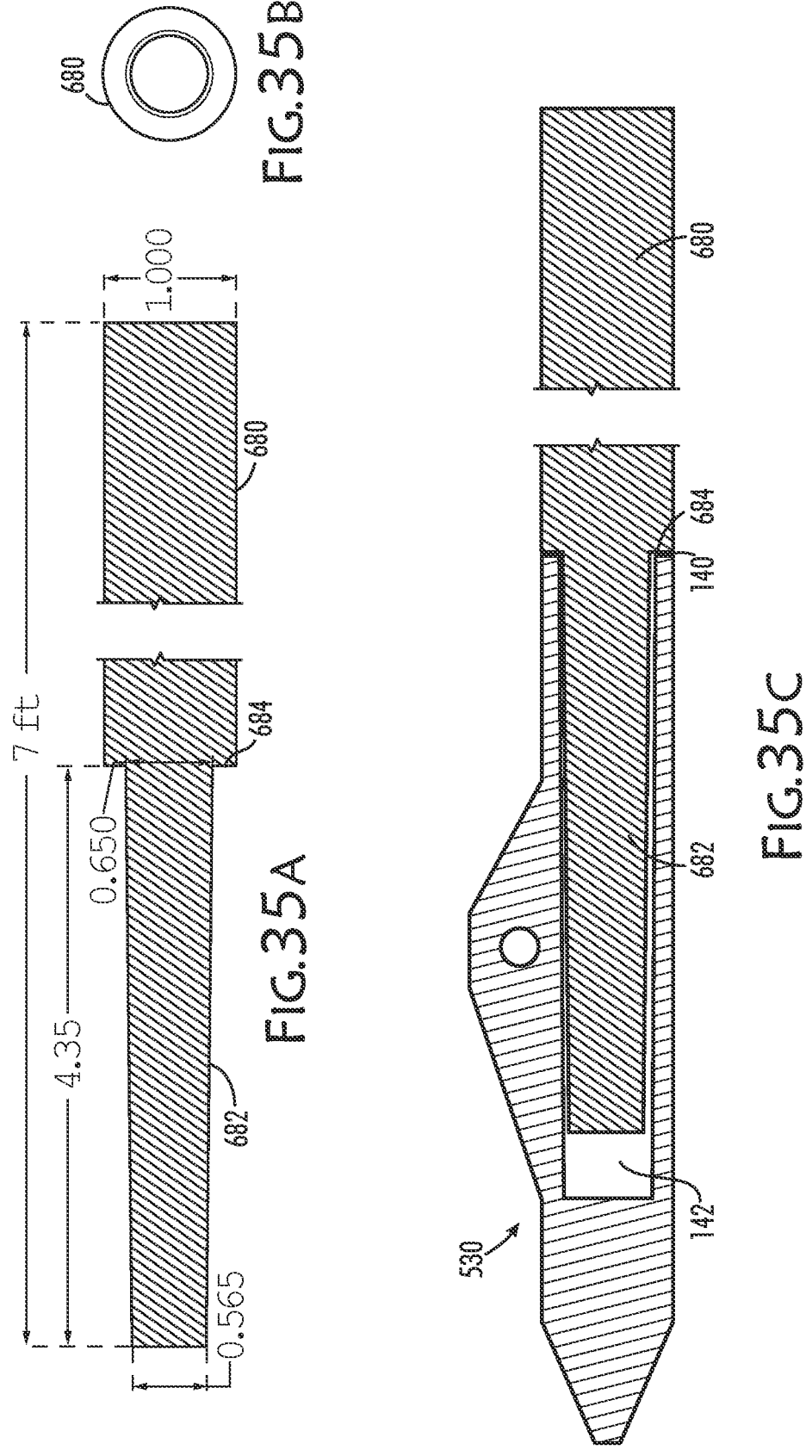
Figures 36A, 36B, 36C:
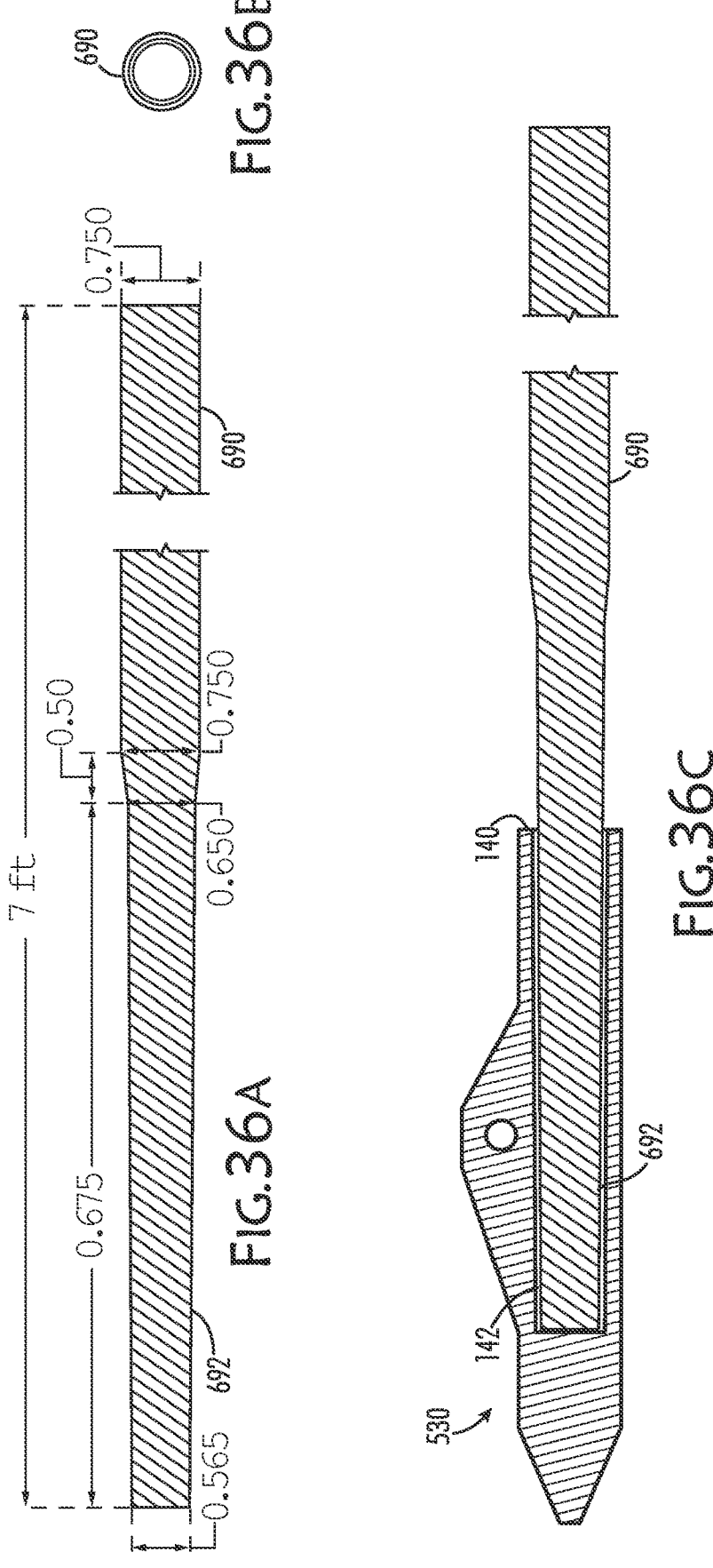
Figure 37A:
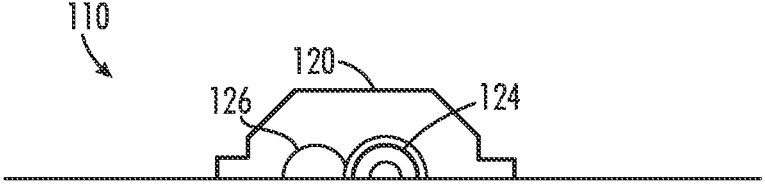
Figure 37B:
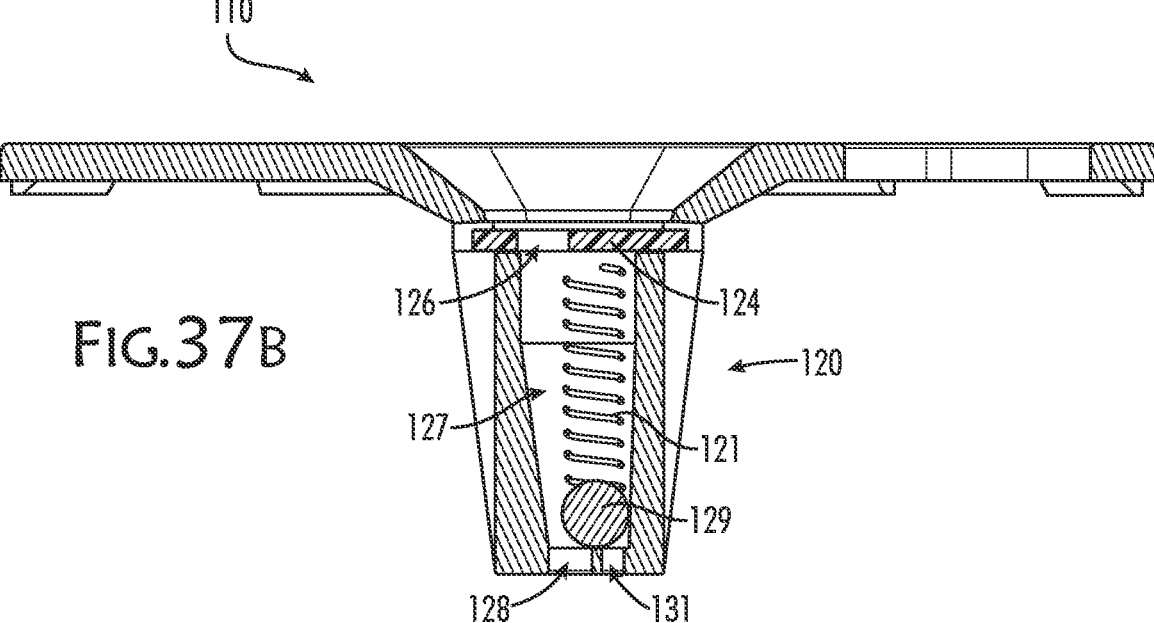
Figure 38:
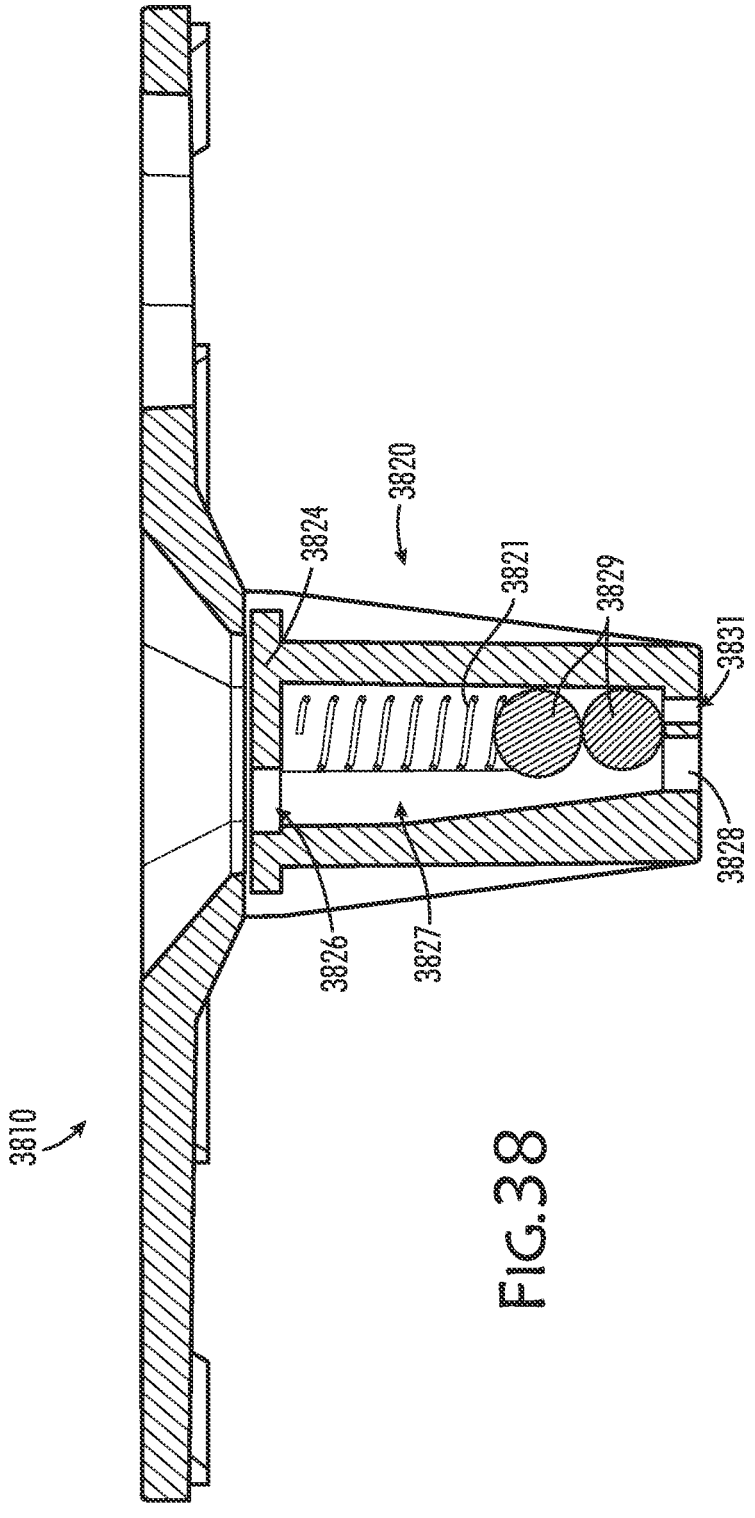
Figure 39A:
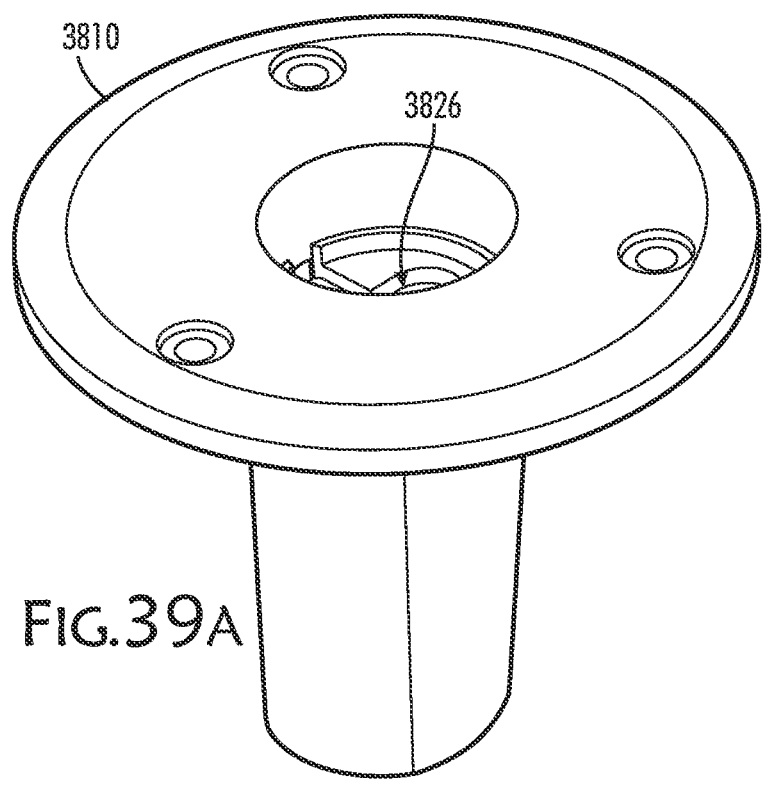
Figure 39B:
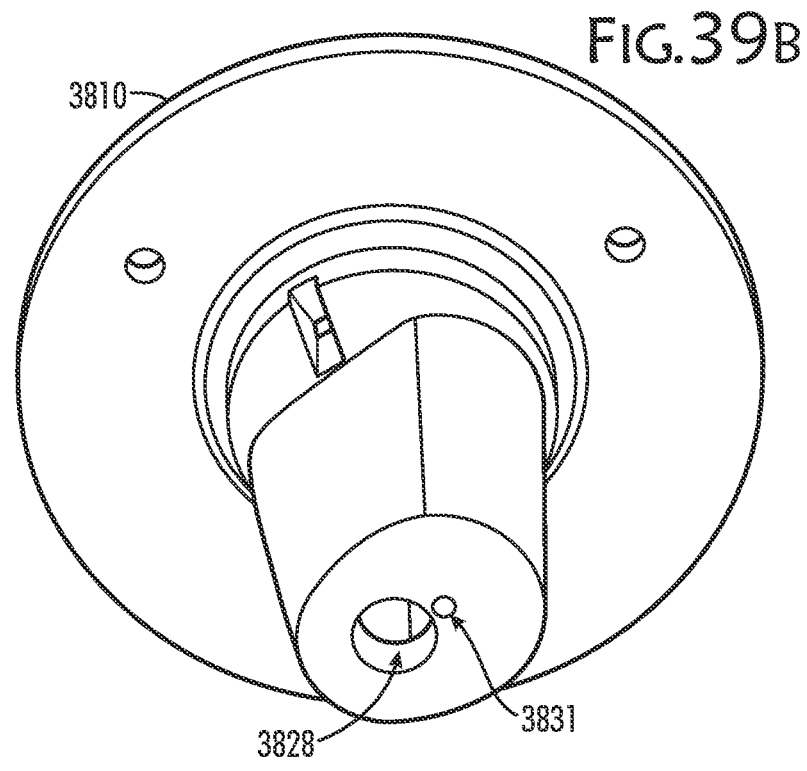
Figures 40A, 40B:
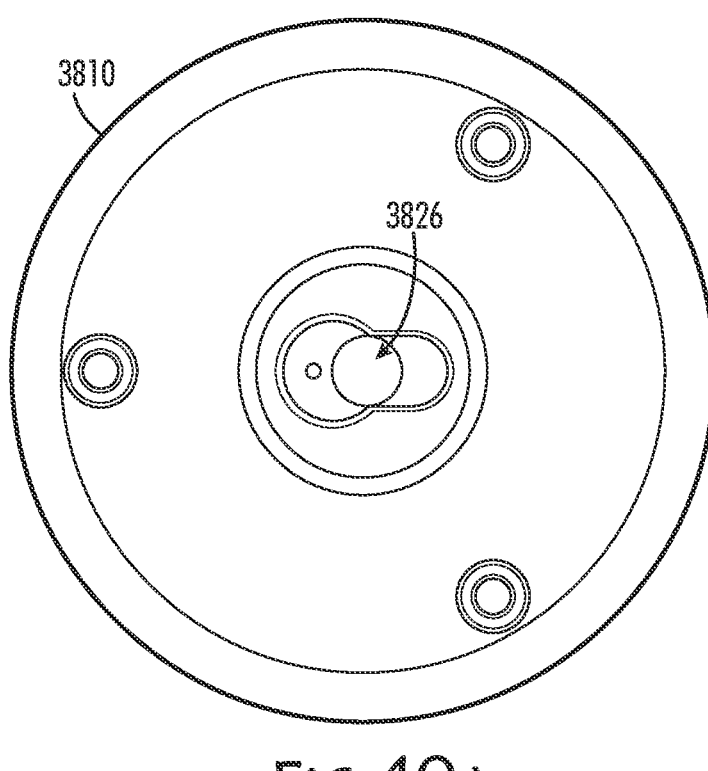
Figure 41A:
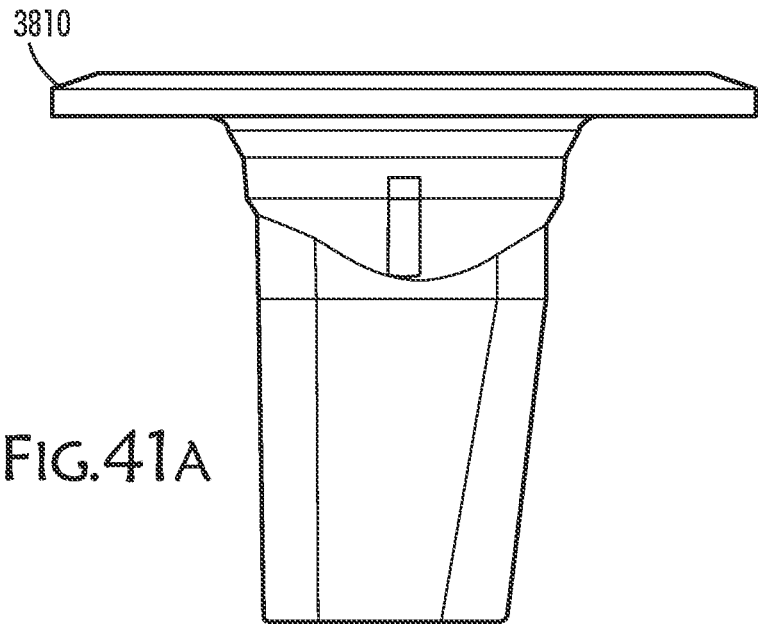
Figure 41B:
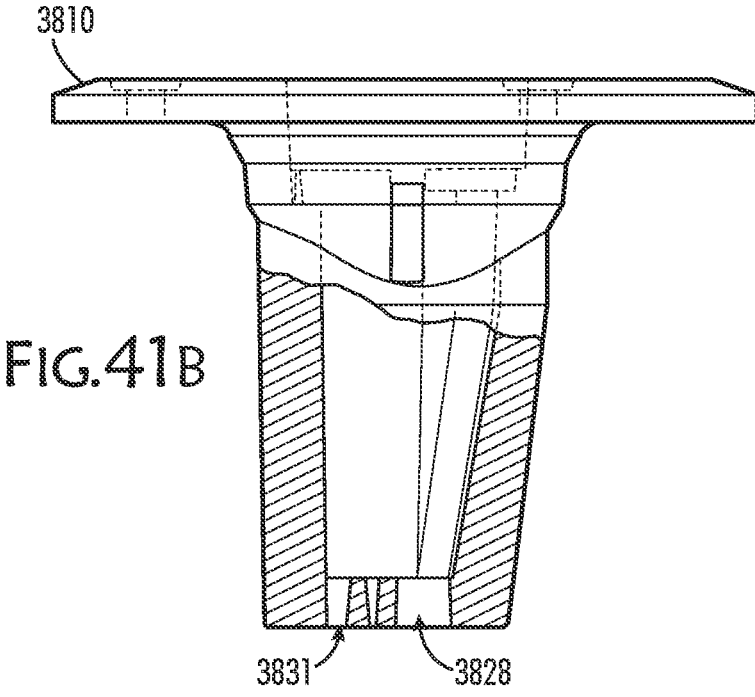
Figure 42A:
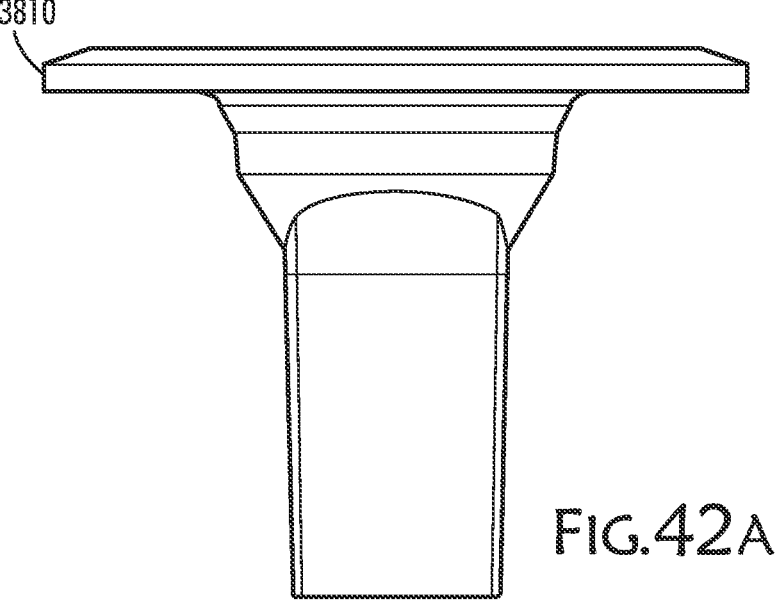
Figure 42B:
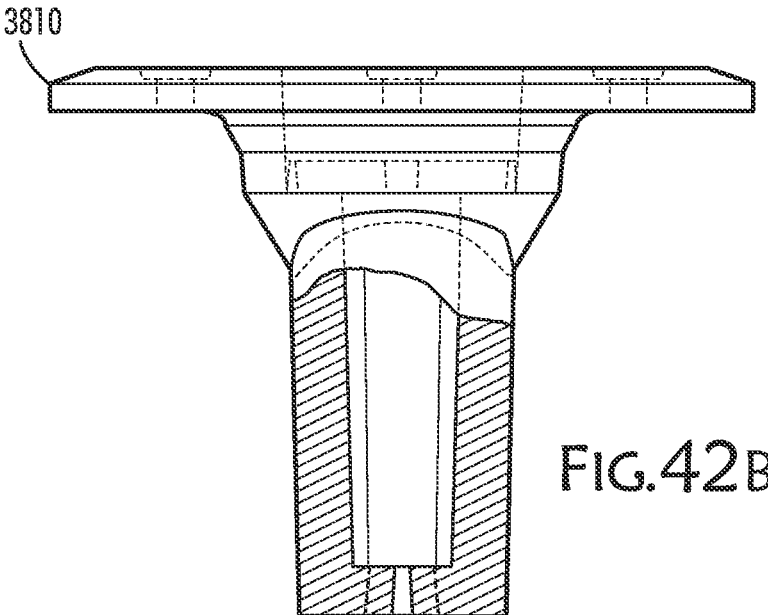
Figure 43A:
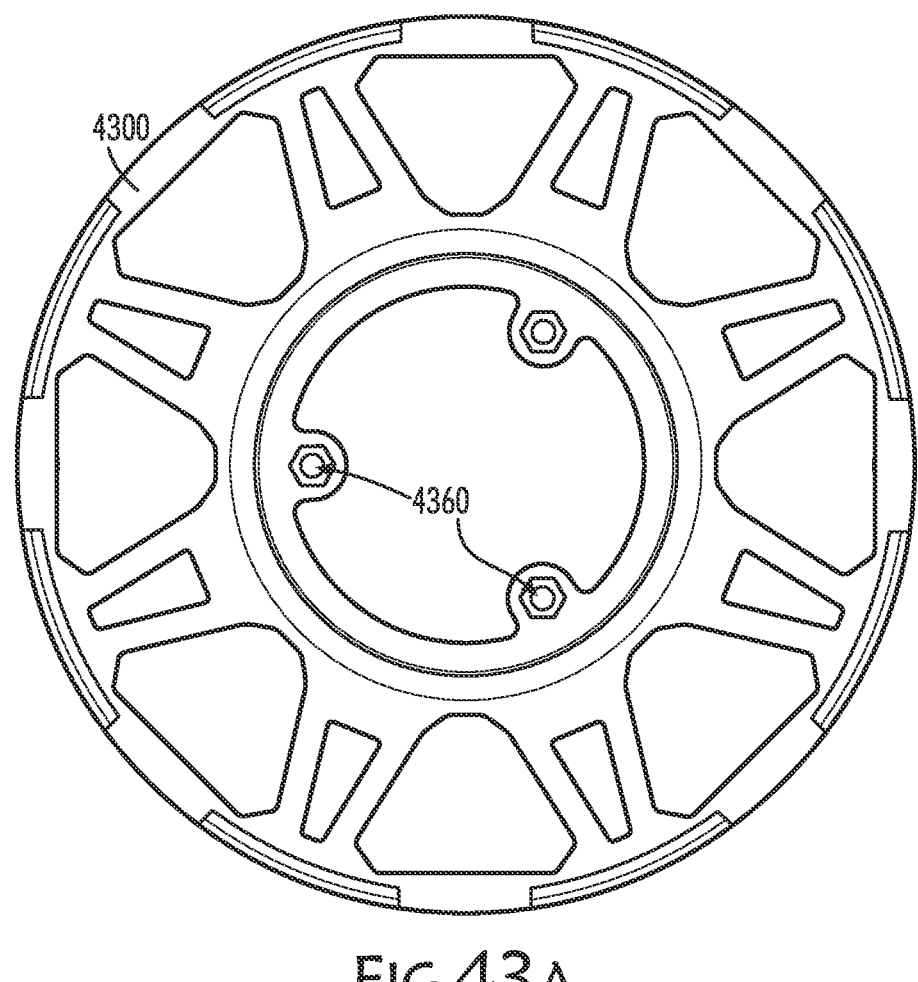
Figure 43B:
Figure 44:
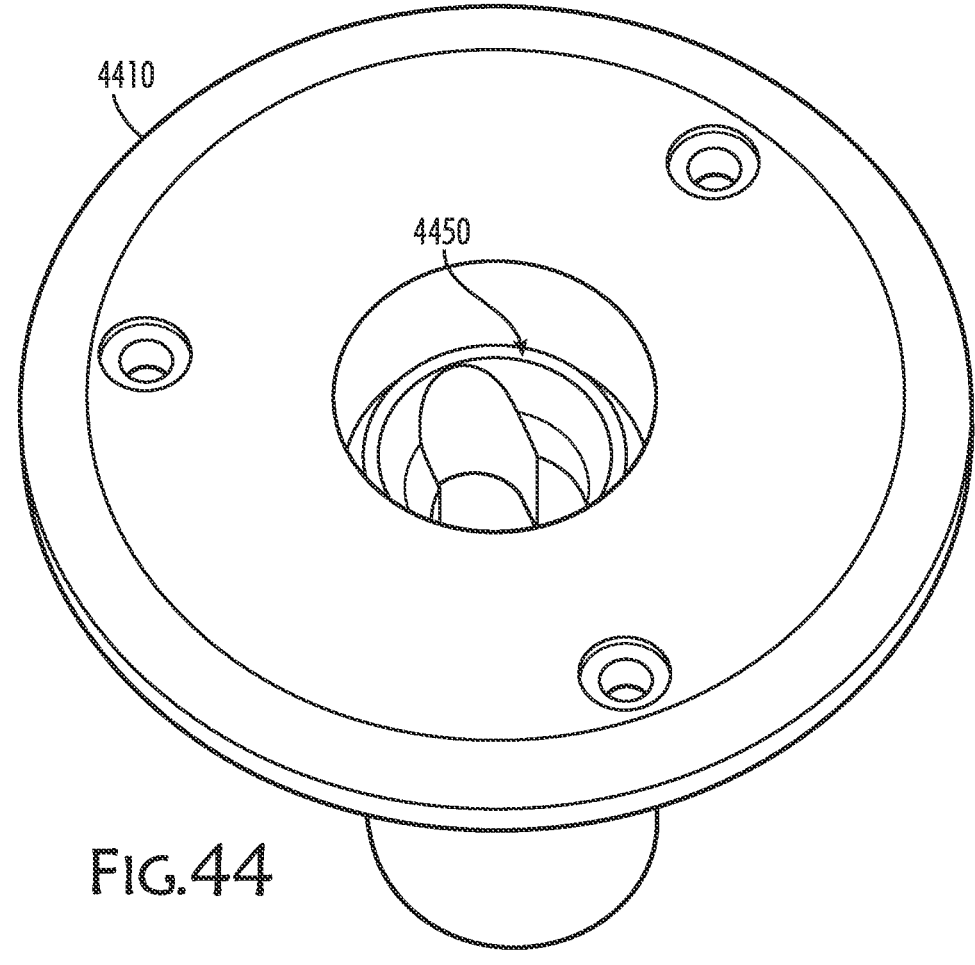

Having thus described the presently disclosed subject matter in general terms, reference will now be made to the accompanying drawings, which are not necessarily drawn to scale, and wherein:

FIG. 1 illustrates an example of the presently disclosed ground anchor assembly;

FIG. 2 illustrates a side view of an example of an anchor reinforced vegetation (ARV) system including an arrangement of the presently disclosed ground anchor assemblies;

FIGS. 3A-3B, FIG. 4, and FIG. 5 illustrate various perspective views of an example of a top cap of the presently disclosed ground anchor assembly;

FIG. 6 and FIG. 7 illustrate various perspective views of an example of a ground anchor of the presently disclosed ground anchor assembly;

FIG. 8A and FIG. 8B illustrate a perspective view of the top cap and the ground anchor, respectively, of the presently disclosed ground anchor assembly;

FIG. 9 illustrates another example of the presently disclosed ground anchor assembly and showing more details of a cable grip mechanism of the top cap;

FIG. 10 illustrates an example of a cable tendon coupled to the ground anchor of the presently disclosed ground anchor assembly;

FIG. 11 illustrates a flow diagram of an example of a method of installing the presently disclosed ground anchor assembly;

FIG. 12A through FIG. 15B illustrate various detailed views of an example of the top cap of the presently disclosed ground anchor assembly;

FIG. 16 through FIG. 18C illustrate yet other detailed views of an example of the top cap of the presently disclosed ground anchor assembly and showing example dimensions thereof;

FIGS. 19A-19B illustrate perspective views of one example of the ground anchor of the presently disclosed ground anchor assembly;

FIGS. 20A-20D illustrate various detailed views of the ground anchor shown in FIGS. 19A-19B and showing example dimensions thereof in inches;

FIG. 21A through FIG. 24D illustrate other detailed views of the ground anchor shown in FIGS. 19A-19B;

FIG. 25 through FIG. 28B illustrate yet other detailed views of the ground anchor shown in FIGS. 19A-19B and showing example dimensions thereof in millimeters;

FIGS. 29A-29B illustrate perspective views of another example of the ground anchor of the presently disclosed ground anchor assembly;

FIGS. 30A-30D illustrate various detailed views of the ground anchor shown in FIGS. 29A-29B and showing example dimensions thereof in inches;

FIGS. 31A-31B illustrate perspective views of yet another example of the ground anchor of the presently disclosed ground anchor assembly;

FIGS. 32A-32D illustrate various detailed views of the ground anchor shown in FIGS. 31A-31B and showing example dimensions thereof in inches;

FIGS. 33A-33D illustrate views of one example of a ground anchor drive rod and cross-sectional views of this drive rod in relation to the ground anchor shown in FIGS. 19A-19B and in relation to the ground anchor shown in FIGS. 29A-29B;

FIGS. 34A-34D illustrate views of another example of a ground anchor drive rod and cross-sectional views of this drive rod in relation to the ground anchor shown in FIGS. 19A-19B and in relation to the ground anchor shown in FIGS. 29A-29B;

FIGS. 35A-35C illustrate views of yet another example of a ground anchor drive rod and a cross-sectional view of this drive rod in relation to the ground anchor shown in FIGS. 31A-31B;

FIGS. 36A-36C illustrate views of still another example of a ground anchor drive rod and a cross-sectional view of this drive rod in relation to the ground anchor shown in FIGS. 31A-31B;

FIGS. 37A-37B illustrate atop cross-sectional view and a side cross-sectional view, respectively, showing more details of the cable grip mechanism of the top cap of the presently disclosed ground anchor assembly;

FIG. 38 illustrates a side cross-sectional view showing more details of a dual-grip cable grip mechanism of the top cap of the presently disclosed ground anchor assembly;

FIGS. 39A and 39B illustrate top and bottom perspective views, respectively, of the top cap shown in FIG. 38;

FIGS. 40A and 40B illustrate top and bottom views, respectively, of the top cap shown in FIG. 38;

FIG. 41A illustrates an external side view of the top cap shown in FIG. 38;

FIG. 41B illustrates a side view showing internal features of the top cap shown in FIG. 38;

FIG. 42A illustrates an external front view of the top cap shown in FIG. 38;

FIG. 42B illustrates a front view showing internal features of the top cap shown in FIG. 38;

FIG. 43A illustrates a top view of a load-bearing plate usable with the top cap shown in FIG. 38;

FIG. 43B illustrates a side view of the load-bearing plate of FIG. 43A; and, FIG. 44 illustrates a top perspective view of a top cap with a crush ridge of the presently disclosed ground anchor assembly.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the subject matter herein.

In some embodiments, the presently disclosed subject matter provides a ground anchor assembly including high-load ground anchor and method of using same. For example, the presently disclosed ground anchor assembly may include a load-bearing top cap tethered to the high-load ground anchor via a cable tendon.

In some embodiments, the presently disclosed ground anchor assembly and method provide a load-bearing top cap that may include a highly reliable, vertically oriented cable grip mechanism.

In some embodiments, the presently disclosed ground anchor assembly and method provide a high-load ground anchor that may include a substantially cylindrical body that has a tapered piercing end and a flat driving end and wherein the flat driving end has a central driving hole. Additionally, the high-load ground anchor may include a pair of outwardly extending side wings along one side of the body and a raised securing portion on the side of body opposite the side wings.

In some embodiments, the presently disclosed ground anchor assembly and method provide an 80-mm long ground anchor, a 120-mm long ground anchor, and a 170 mm-180 mm long ground anchor.

In some embodiments, the presently disclosed ground anchor assembly and method provide a high-load ground anchor that may have, for example, a "bell-shaped" cross section and a "cleat-shaped" footprint that provides a high pullout resistance.

In some embodiments, the presently disclosed ground anchor assembly and method provide a high-load ground anchor with multiple drive options, such as, but not limited to, (1) a drive rod positioned to strike the inside of the ground anchor, or (2) a drive rod positioned to strike the back end, external face of the ground anchor.

In some embodiments, the presently disclosed ground anchor assembly and method provide a high-load ground anchor with multiple drive options that (1) support a larger drive rod and larger strike face, (2) allows reduced wear on the rod, and (3) allows for better driving in challenging soil conditions; as compared with conventional ground anchors.

Further, a method of installing the presently disclosed ground anchor assembly including the high-load ground anchor is provided.

Referring now to FIG. 1 is an illustration of an example of the presently disclosed ground anchor assembly 100. An arrangement of one or more of the presently disclosed ground anchor assemblies 100 may be used in various ground anchoring applications. Ground anchoring applications utilizing ground anchor assembly 100 may include, but are not limited to, securing high-strength ground-stabilizing fabric in erosion control and geotechnical engineering applications; securing hard armor (concrete blocks and mats or rock bags) to slopes, levees, and shorelines; securing temporary and/or permanent poles, beams, frames, walls, or structures; and the like. By way of example, an arrangement of one or more of the presently disclosed ground anchor assemblies 100 may be used in an anchor reinforced vegetation (ARV) system, such as ARV system 200 shown in FIG. 2.

Ground anchor assembly 100 may include, for example, a top cap 110 tethered to a ground anchor 130 via a cable tendon 150. Cable tendon 150 may be, for example, a ⅛-inch diameter zinc alloy-coated steel or extra strong steel cable. The length of cable tendon 150 is customized depending on the installation depth of ground anchor 130. Further, the invention provides a drive rod 170 for driving ground anchor 130 into the ground. More details of examples of drive rods are shown and described hereinbelow with reference to FIGS. 33A-33D, FIGS. 34A-34D, FIGS. 35A-35C, and FIGS. 36A-36C.

Design features of top cap 110 may include, but are not limited to, (1) a cable grip mechanism that has increased grip strength as compared with conventional top caps, (2) an improved cable release mechanism as compared with conventional top caps, and (3) an increased load-bearing capacity as compared with conventional top caps. More details of examples of top cap 110 are shown and described hereinbelow with reference to FIGS. 3A-3B, FIG. 4, FIG. 5, and FIG. 12A through FIG. 18C.

Ground anchor 130 of ground anchor assembly 100 may be called a percussion driven anchor (PDA), ground anchor, earth anchor, and/or mechanical anchor. Design features of ground anchor 130 may include, but are not limited to, (1) an increased pullout resistance as compared with conventional ground anchors, and (2) multiple drive options, for example, use a drive rod positioned to strike inside ground anchor 130 or drive on the back end, external face of ground anchor 130. This feature allows for the use of a larger drive rod and larger strike face (from about 37% to about 70% larger) as compared with conventional ground anchors. Additionally, this feature reduces wear on the drive rod and allows for better driving in challenging soil conditions. More details of examples of ground anchor 130 are shown and described hereinbelow with reference to FIG. 6, FIG. 7, FIG. 10, and FIGS. 19A-19B through FIGS. 32A-32D.

Referring now to FIG. 2 is a side view of an example of ARV system 200 including an arrangement of the presently disclosed ground anchor assemblies 100 used for securing high-strength ground-stabilizing fabric in an erosion control application. For example, ARV system 200 may include a soil base 210 that has a sloped topology 212. Additionally, certain high-performance turf reinforcement mat (HPTRM) 214 may be installed atop the surface of the sloped soil base 210 using an arrangement of ground anchor assemblies 100. HPTRM 214 conforms to the surface of soil base 210 creating a soil-mat interaction that stabilizes the surface.

Each of the ground anchor assemblies 100 includes the top cap 110 tethered to the ground anchor 130 via the cable tendon 150. Ground anchors 130 may be deep-seated anchors or PDAs that are embedded under a potential failure plane, harnessing the strength of the HPTRM 214 to hold saturated, surficial soils. Top cap 110 of each ground anchor assembly 100 allows tensioning to be applied to its cable tendon 150, creating a load-bearing capacity of the system. The structure of HPTRM 214 allows for rapid vegetation growth, with the roots integrating to create a stabilized surface strata. The ARV system 200 that includes the HPTRM 214 secured using the presently disclosed ground anchor assemblies 100 may be used to protect ground from erosion and add stability to the soil base 210. The HPTRM 214, ground anchor assemblies 100, and vegetation combine to create the integrated ARV system 200. In ARV system 200, the number and/or arrangement of ground anchor assemblies 100 can be designed to optimize performance.

Referring now to FIGS. 3A-3B, FIG. 4, and FIG. 5 is various perspective views of an example of top cap 110 of the presently disclosed ground anchor assembly 100. In this example, top cap 110 may include a load-bearing face plate 112 that has an arrangement of openings 114 (e.g., six openings 114). The openings 114 in face plate 112 allow, for example, vegetation to grow through top cap 110. A sloped transition portion 116 is provided at a center portion of face plate 112. Sloped transition portion 116 leads to a cable grip portion 118. Cable grip portion 118 is a compartment or housing extending to one side of face plate 112 and substantially perpendicular to the plane of face plate 112. In ground anchor assembly 100, cable grip portion 118 is facing ground anchor 130. Top cap 110 may be formed of a strong, environmentally tolerant material, such as, but not limited to, zinc alloy, plastic, aluminum, stainless steel, coated steel, and brass.

Additionally, sloped transition portion 116 and cable grip portion 118 have more than four corners, for example they may be substantially octagonal shaped in some embodiments of the invention. The octagonal-shaped sloped transition portion 116 in top cap 110 may dramatically increase the load-bearing capacity of top cap 110 compared with conventional top caps that may have a rectangular-shaped transition portion and/or cable grip portion. For example, the rectangular-shaped cable grip portion of conventional top caps may result in high stresses at the corners that can lead to possible failure points.

A cable grip mechanism 120 may be installed in cable grip portion 118. Further, cable grip mechanism 120 may include a keyhole-shaped shaft 122. When top cap 110 is installed, the loose end of cable tendon 150 extends through cable grip portion 118 of top cap 110 and out of the ground. Accordingly, cable tendon 150 passes through cable grip mechanism 120, which provides a one-way stop and grip mechanism. More details of cable grip mechanism 120 are shown and described hereinbelow with reference to FIG. 9.

Top cap 110 provides a top grip portion (e.g., face plate 112 with openings 114) with a central vertical displacement portion, which is sloped transition portion 116 and cable grip portion 118. The vertical keyhole-shaped shaft 122 of cable grip portion 118 receives cable tendon 150 and a spring 121 (see FIG. 9 and FIGS. 37A-37B) to allow for the advancement and/or releasing of cable tendon 150 within the keyhole-shaped shaft 122.

Referring now to FIG. 6 and FIG. 7 is various perspective views of an example of ground anchor 130 of the presently disclosed ground anchor assembly 100. In this example, ground anchor 130 may include a substantially cylindrical body 132 that has a tapered piercing end 134 and a flat driving end 140 that has a central driving hole 142. Piercing end 134 may further include an arrangement of piercing end grooves 136 and piercing end ribs 138 (e.g., four piercing end grooves 136 and four piercing end ribs 138). Additionally, a pair of outwardly extending side wings 144 may be provided along at least one side of body 132. Further, a raised securing portion 146 is provided on the side of body 132 that is opposite side wings 144. A thru-hole 148 is provided in securing portion 146. Thru-hole 148 may be used for securing cable tendon 150 to ground anchor 130 (see FIG. 10). Ground anchor 130 may be formed of a strong, environmentally tolerant material, such as, but not limited to, zinc alloy, ductile iron, aluminum, stainless steel, and brass.

The shape of body 132 of ground anchor 130 is such that a drive rod (e.g., drive rod 170) can either (1) strike inside driving hole 142 at driving end 140 of body 132 or (2) strike outside at the flat driving end 140 of body 132. Also, piercing end 134 of body 132 is generally conical having a plurality of equally-distanced piercing end ribs 138 terminating at a leading edge, which itself has a plurality of symmetrical piercing end grooves 136. The tapered piercing end 134 at the head of ground anchor 130 is designed to penetrate the soil with a sharp driving edge without deflecting, resulting in improved installation as compared with conventional ground anchors.

Referring now to FIG. 8A and FIG. 8B is other perspective views of top cap 110 and ground anchor 130, respectively, of the presently disclosed ground anchor assembly 100. Additionally, FIG. 9 shows another view of an example of the presently disclosed ground anchor assembly 100 and showing more details of cable grip mechanism 120 of top cap 110. Cable grip mechanism 120 provides the mechanism for grasping and holding cable tendon 150. For example, cable grip mechanism 120 may provide a one-way stop for holding cable tendon 150. Further, the one-way stop may include a washer (not shown) or other type of load-spreading arrangement (not shown). More details of an example of cable grip mechanism 120 are shown and described hereinbelow with reference to FIGS. 37A-37B.

Referring now to FIG. 10 is an illustration of an example of cable tendon 150 coupled to ground anchor 130 of the presently disclosed ground anchor assembly 100. For example, cable tendon 150 may be looped through thru-hole 148 of securing portion 146 and then fastened on itself, as shown. Securing portion 146 of ground anchor 130 provides a cable bridge that is centered on body 132. Again, the tapered piercing end 134 at the head of ground anchor 130 is designed to penetrate the soil with a sharp driving edge without deflecting, resulting in easy installation. Ground anchor 130 provides rapid load-locking, protecting more soil, with less loss of depth. Here, "load-locking" means that due to the shape of ground anchor 130, once ground anchor 130 is driven, then cable tendon 150 is pulled, which turns ground anchor 130 orthogonal to the cable direction, thereby mounting a resistance to pullout. The faster this happens, the deeper ground anchor 130 stays in the ground. The deeper that ground anchor 130 is in the ground, the more stability it provides. For example, if an anchor is pulled 3 inches to achieve full resistance compared to 8 inches, then the anchor is 5 inches deeper in the ground. In a typical drive depth of about 36 inches, the 5-inch additional depth is a large proportion of the 36-inch drive depth.

Referring now to FIG. 11 is a flow diagram of an example of a method 300 of installing the presently disclosed ground anchor assembly 100. Method 300 may include, but it not limited to, the following steps.

At a step 310, the presently disclosed ground anchor assembly is provided at the job site. For example, ground anchor assembly 100 as described hereinabove with reference to FIG. 1 through FIG. 10 may be provided at the job site.

At a step 315, the ground anchor is driven into the ground with the attached cable tendon extending out of the ground. For example, ground anchor 130 of ground anchor assembly 100 may be driven into the ground with the attached cable tendon 150 extending out of the ground. In one example, a certain drive rod 170 may be inserted into driving hole 142 at driving end 140 of ground anchor 130. Then, percussion drive forces may be applied to the proximal end of drive rod 170 to drive ground anchor 130 into the ground, for example, as shown in FIG. 2. In another example, a certain drive rod 170 may be placed against the flat driving end 140 of ground anchor 130 for pushing, rather than pushing from inside driving hole 142.

At a step 320, the proximal end of the cable tendon is passed through any layers and/or configurations of ground reinforcement materials. For example, the proximal end of cable tendon 150 may be passed through any layers and/or configurations of ground reinforcement materials, such as HPTRM 214 shown in FIG. 2.

At a step 325, the proximal end of the cable tendon is threaded through the top cap and then the top cap is positioned atop the ground. For example, with cable grip portion 118 of top cap 110 oriented toward the ground, the proximal end of cable tendon 150 may be threaded through cable grip mechanism 120 of cable grip portion 118 of top cap 110. Then, top cap 110 may be positioned atop the ground. For example, cable grip portion 118, which is the central vertical displacement portion, is pushed into the ground until the underside of face plate 112 presses against the ground.

At a step 330, tension is pulled on the proximal end of the cable tendon until the desired cable tension is reached and the ground anchor is set in the soil. For example, tension may be pulled on the proximal end of cable tendon 150 until the desired cable tension is reached and ground anchor 130 is set in the soil.

At a step 335, the proximal end of the cable tendon is locked within the top cap and then the excess cable tendon is cut off. For example, while still holding the tension set in step 330, the proximal end of cable tendon 150 may be locked within cable grip mechanism 120 of cable grip portion 118 of top cap 110. Then, the excess cable tendon 150 may be cut off.

In another embodiment of method 300, the use of top cap 110 in steps 325, 330, and 335 may be omitted. Rather, tension may be pulled on the proximal end of cable tendon 150 and then cable tendon 150 may be fastened or tied off to an object to be supported and/or stabilized, such as a pole, beam, frame, wall, structure; and the like.

Referring now to FIG. 12A through FIG. 15B is various detailed views of an example of top cap 110 of the presently disclosed ground anchor assembly 100. Further, FIG. 16 through FIG. 18C is yet other detailed views of an example of top cap 110 of ground anchor assembly 100 and showing example dimensions thereof in millimeters. In one example, the overall diameter of top cap 110 may be about 101.7 mm (see FIG. 16) and the overall depth of top cap 110 may be about 38 mm (see FIG. 18A).

Figure 28A:
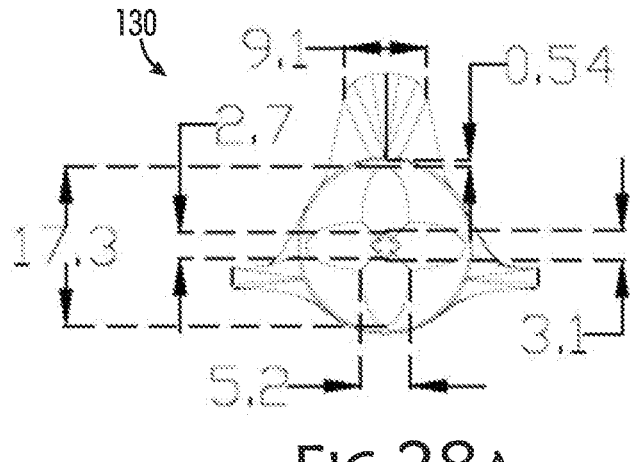
Figure 28B:
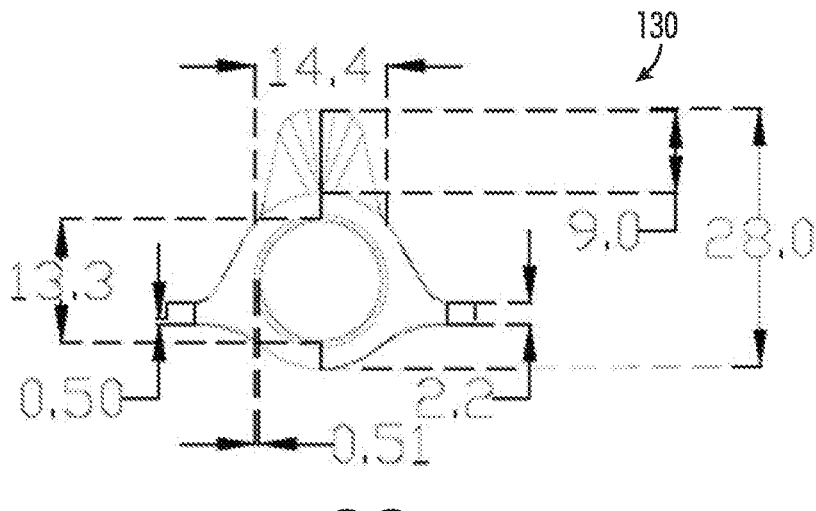

Referring now to FIGS. 19A-19B are perspective views of one example of ground anchor 130 of the presently disclosed ground anchor assembly 100. Further, FIGS. 20A-20D are various detailed views of ground anchor 130 shown in FIGS. 19A-19B and showing example dimensions thereof in inches. Further, FIG. 21A through FIG. 24D is other detailed views of ground anchor 130 shown in FIGS. 19A-19B. Further, FIG. 25 through FIG. 28B is yet other detailed views of ground anchor 130 shown in FIGS. 19A-19B and showing example dimensions thereof in millimeters. Example specifications of ground anchor assembly 100 including top cap 110 shown in FIG. 12A through FIG. 15B and ground anchor 130 shown in FIGS. 19A-19B through FIG. 28B are shown below in Table 1 and Table 2. It should be understood that the specifications shown are by way of example only, and that various components could be longer or shorter, wider or narrower, and/or lighter or heavier, depending on the embodiment and/or method and/or application of use.

TABLE 1

Example specifications of ground anchor assembly 100 including top cap 110 shown in FIG. 12A through FIG. 15B and ground anchor 130 shown in FIGS. 19A-19B through FIG. 28B

| | |
|---|---|
| Top cap 110 | 4-inch Diameter Zinc Alloy |
| Cable grip mechanism 120 | Spring-loaded Ceramic Crush Roller |
| Cable tendon 150 | ⅛-inch Diameter ZA-Coated Steel, 3 feet; |
| Ground anchor 130 | Zinc Alloy 3.15 inches (80 mm) × 1.3 inches (33 mm) |
| Ground anchor 130 | 3.2 in (80 mm) long, 1.3 in (33.3 mm) wide, 1.1 in (28 mm) high |

TABLE 1-continued

Example specifications of ground anchor assembly 100 including top cap 110 shown in FIG. 12A through FIG. 15B and ground anchor 130 shown in FIGS. 19A-19B through FIG. 28B

| | |
|---|---|
| Anchor Bearing Area | 3.4 square inches (2209 square mm) |
| Typical Working Load | 650 lbs |
| Maximum Working Load | 1,150 lbs |
| Ultimate Assembly Strength | 1,300 lbs |
| Ultimate Cable Length | 1,700 lbs |
| Typical Use | Workhorse Assembly |

TABLE 2

Example specifications of ground anchor assembly 100 including top cap 110 shown in FIG. 12A through FIG. 15B and ground anchor 130 shown in FIGS. 19A-19B through FIG. 28B

| | |
|---|---|
| Top cap 110 | 4-inch Diameter Zinc Alloy |
| Cable grip mechanism 120 | Spring-loaded Ceramic Crush Roller |
| Cable tendon 150 | ⅛-inch Diameter ZA-Coated Extra Strong Steel, 3 feet |
| Ground anchor 130 | Zinc Alloy 3.15 inches (80 mm) × 1.3 inches (33 mm) |
| Ground anchor 130 | 3.2 in (80 mm) long, 1.3 in (33.3 mm) wide, 1.1 in (28 mm) high |
| Anchor Bearing Area | 3.4 square inches (2209 square mm) |
| Typical Working Load | 750 lbs |
| Maximum Working Load | 1,350 lbs |
| Ultimate Assembly Strength | 1,500 lbs |
| Ultimate Cable Length | 2,000 lbs |
| Typical Use | High Strength Light Assembly |

Referring now to FIGS. 29A-29B are perspective views of a ground anchor 430, which is another example of the ground anchor of the presently disclosed ground anchor assembly 100. Further, FIGS. 30A-30D show various detailed views of ground anchor 430 shown in FIGS. 29A-29B and showing example dimensions thereof in inches. Example specifications of ground anchor assembly 100 including top cap 110 shown in FIG. 12A through FIG. 15B and ground anchor 430 shown in FIGS. 29A-29B and FIGS. 30A-30D are shown below in Table 3 and Table 4. It should be understood that the specifications shown are by way of example only, and that various components could be longer or shorter, wider or narrower, and/or lighter or heavier, depending on the embodiment and/or method and/or application of use.

TABLE 3

Example specifications of ground anchor assembly 100 including top cap 110 shown in FIG. 12A through FIG. 15B and ground anchor 430 shown in FIGS. 29A-29B and FIGS. 30A-30D

| | |
|---|---|
| Top cap 110 | 4-inch Diameter Zinc Alloy |
| Cable grip mechanism 120 | Spring-loaded Ceramic Crush Roller |
| Cable tendon 150 | ⅛-inch Diameter ZA-Coated Steel, 3 feet |
| Ground anchor 130 | Zinc Alloy 4.72 inches (120 mm) × 1.57 inches (40 mm) |
| Ground anchor 130 | 4.7 in (120 mm) long, 1.6 in (40.6 mm) wide, 1.3 in (33.3 mm) high |
| Anchor Bearing Area | 6.0 square inches (3871 square mm) |
| Typical Working Load | 650 lbs |
| Maximum Working Load | 1,150 lbs |
| Ultimate Assembly Strength | 1,300 lbs |
| Ultimate Cable Length | 1,700 lbs |
| Typical Use | Soft Soil Workhorse Light |

TABLE 4

Example specifications of ground anchor assembly 100 including top cap 110 shown in FIG. 12A through FIG. 15B and ground anchor 430 shown in FIGS. 29A-29B and FIGS. 30A-30D

| | |
|---|---|
| Top cap 110 | 6-inch Diameter Zinc Alloy |
| Cable grip mechanism 120 | Spring-loaded Ceramic Crush Roller |
| Cable tendon 150 | ¼-inch Diameter |
| | ZA-Coated Steel, 6 feet |
| Ground anchor 130 | Zinc Alloy 4.72 inches (120 mm) × |
| | 1.57 inches (40 mm) |
| Ground anchor 130 | 4.7 in (120 mm) long, |
| | 1.6 in (40.6 mm) wide, |
| | 1.3 in (33.3 mm) high |
| Anchor Bearing Area | 6.0 square inches (3871 square mm) |
| Typical Working Load | 2,000 lbs |
| Maximum Working Load | 3,600 lbs |
| Ultimate Assembly Strength | 4,000 lbs |
| Ultimate Cable Length | 5,000 lbs |
| Typical Use | Hard Soil Heavy Assembly |

Referring now to FIGS. 31A-31B are perspective views of a ground anchor 530, which is another example of the ground anchor of the presently disclosed ground anchor assembly 100. Further, FIGS. 32A-32D show various detailed views of a ground anchor 530 shown in FIGS. 31A-31B and showing example dimensions thereof in inches. Example specifications of ground anchor assembly 100 including top cap 110 shown in FIG. 12A through FIG. 15B and ground anchor 530 shown in FIGS. 31A-31B and FIGS. 32A-32D are shown below in Table 5. It should be understood that the specifications shown are by way of example only, and that various components could be longer or shorter, wider or narrower, and/or lighter or heavier, depending on the embodiment and/or method and/or application of use.

TABLE 5

Example specifications of ground anchor assembly 100 including top cap 110 shown in FIG. 12A through FIG. 15B and ground anchor 530 shown in FIGS. 31A-31B and FIGS. 32A-32D

| | |
|---|---|
| Top cap 110 | 6-inch Diameter Zinc Alloy |
| Cable grip mechanism 120 | Spring-loaded Ceramic Crush Roller |
| Cable tendon 150 | ¼-inch Diameter |
| | ZA-Coated Steel, 6 feet |
| Ground anchor 130 | Zinc Alloy 7.08 inches (180 mm) × |
| | 2.17 inches (56 mm) |
| Ground anchor 130 | 7.1 in (180 mm) long, |
| | 2.2 in (56 mm) wide, |
| | 1.6 in (40.6 mm) high |
| Anchor Bearing Area | 13.0 square inches (8387 square mm) |
| Typical Working Load | 2,000 lbs |
| Maximum Working Load | 3,600 lbs |
| Ultimate Assembly Strength | 4,000 lbs |
| Ultimate Cable Length | 5,000 lbs |
| Typical Use | Standard/Soft Soil Heavy Assembly |

Referring now again to FIGS. 19A-19B through FIGS. 32A-32D, ground anchors 130, 430, 530 generally have a "bell-shaped" cross section and a "cleat-shaped" footprint, which provides a high pullout resistance. Further, side wings 144 are substantially parallel (not angled) with respect to a horizontal plane.

In the presently disclosed ground anchor assembly 100, anchor-specific installation pushrods, such as drive rod 170, may be provided. That is, the size and/or features of the drive rods may vary depending on the size and/or features of the ground anchor. Further, the anchor-specific installation pushrods, such as drive rod 170, may be provide multiple drive options. Examples of various drive rods are shown and described hereinbelow with reference to FIGS. 33A-33D through FIGS. 36A-36C.

Referring now to FIGS. 33A-33D are views of one example of drive rod 170 that is designed for use with ground anchor 130 shown in FIGS. 19A-19B through FIG. 28B, which is the 80 mm-long ground anchor. Drive rod 170 is also designed for use with ground anchor 430 shown in FIGS. 29A-29B and FIGS. 30A-30D, which is the 120 mm-long ground anchor. FIGS. 33A-33D also shows cross-sectional views of drive rod 170 in relation to ground anchor 130 and in relation to ground anchor 430.

In this example, drive rod 170 is the type that is designed to push against the outside of ground anchors 130, 430, namely, on the flat driving end 140 of ground anchors 130, 430. Accordingly, drive rod 170 may include a rod tip 172 that is designed to fit into driving hole 142 of ground anchors 130, 430. However, a substantially flat shoulder portion 174 of drive rod 170 is designed to contact the flat driving end 140 of ground anchors 130, 430 before rod tip 172 contacts the solid end of driving hole 142. In this way, rod tip 172 provides easy alignment of drive rod 170 to the flat driving end 140 of ground anchors 130, 430. Accordingly, drive rod 170 is designed to strike the back end, external face of ground anchors 130, 430 without striking the inside portion ground anchors 130, 430.

In one example, the overall length of drive rod 170 may be about 4 feet, while the length of rod tip 172 may be about 2.35 inches. Further, the diameter of drive rod 170 may be about 0.75 inches, while the diameter of rod tip 172 may taper from about 0.45 inches to about 0.4 inches. Accordingly, the flat shoulder portion 174 of drive rod 170 may be about 0.15 inches wide.

Referring now to FIGS. 34A-34D are views of one example of a drive rod 670 that is designed for use with ground anchor 130 shown in FIGS. 19A-19B through FIG. 28B, which is the 80 mm-long ground anchor. Drive rod 670 is also designed for use with ground anchor 430 shown in FIGS. 29A-29B and FIGS. 30A-30D, which is the 120 mm-long ground anchor. FIGS. 34A-34D also shows cross-sectional views of drive rod 670 in relation to ground anchor 130 and in relation to ground anchor 430.

In this example, drive rod 670 is the type that is designed to push against the inside of ground anchors 130, 430, namely, on the solid end of driving hole 142 near piercing end 134. Namely, drive rod 670 may include a rod tip 672 that is designed to fit into driving hole 142 of ground anchors 130, 430 and then contact the solid end of driving hole 142. Accordingly, drive rod 670 is designed to strike the inside portion ground anchors 130, 430. In one example, the overall length of drive rod 670 may be about 4 feet, while the length of rod tip 672 may be about 5 inches. Further, the diameter of drive rod 670 may be about 0.5 inches, while the diameter of rod tip 672 may taper from about 0.435 inches to about 0.41 inches.

Referring now to FIGS. 35A-35C are views of one example of a drive rod 680 that is designed for use with ground anchor 530 shown in FIGS. 31A-31B and FIGS. 32A-32D, which is the 180 mm-long ground anchor. FIGS. 35A-35C also shows a cross-sectional view of drive rod 680 in relation to ground anchor 530.

In this example, drive rod 680 is the type that is designed to push against the outside of ground anchor 530, namely, on the flat driving end 140 of ground anchor 530. Accordingly, drive rod 680 may include a rod tip 682 that is designed to fit into driving hole 142 of ground anchor 530. However, a substantially flat shoulder portion 684 of drive rod 680 is designed to contact the flat driving end 140 of ground anchor 530 before rod tip 682 contacts the solid end of driving hole 142. In this way, rod tip 682 provides easy alignment of drive rod 680 to the flat driving end 140 of ground anchor 530. Accordingly, drive rod 680 is designed to strike the back end, external face of ground anchor 530 without striking the inside portion ground anchor 530.

In one example, the overall length of drive rod 680 may be about 7 feet, while the length of rod tip 682 may be about 4.35 inches. Further, the diameter of drive rod 680 may be about 1 inch, while the diameter of rod tip 682 may taper from about 0.65 inches to about 0.565 inches. Accordingly, the flat shoulder portion 684 of drive rod 680 may be about 0.175 inches wide.

Referring now to FIGS. 36A-36C are views of one example of a drive rod 690 that is designed for use with ground anchor 530 shown in FIGS. 31A-31B and FIGS. 32A-32D, which is the 180 mm-long ground anchor. FIGS. 36A-36C also shows a cross-sectional view of drive rod 690 in relation to ground anchor 530.

In this example, drive rod 690 is the type that is designed to push against the inside of ground anchor 530, namely, on the solid end of driving hole 142 near piercing end 134. Namely, drive rod 690 may include a rod tip 692 that is designed to fit into driving hole 142 of ground anchor 530 and then contact the solid end of driving hole 142. Accordingly, drive rod 690 is designed to strike the inside portion ground anchor 530. In one example, the overall length of drive rod 690 may be about 7 feet, while the length of rod tip 692 may be about 6.75 inches. Further, the diameter of drive rod 690 may be about 0.75 inches, while the diameter of rod tip 692 may taper from about 00.65 inches to about 0.565 inches.

Referring now again to FIGS. 33A-33D through FIGS. 36A-36C, drive rods 170, 670, 680, 690 may be formed, for example, of strong and hard tool steel. Additionally, the design of drive rods 170, 670, 680, 690 allows for the use of a larger rod and larger strike face (from about 37% to about 70% larger) as compared with conventional drive rods. Further, the design of drive rods 170, 670, 680, 690 also reduces wear on the rod and allows for better driving in challenging soil conditions as compared with conventional drive rods.

In summary and referring now again to FIG. 1 through FIGS. 36A-36C, the presently disclosed ground anchor assembly 100 and method 300 provide a load-bearing top cap 110 tethered to the high-load ground anchor 130 via cable tendon 150. The load-bearing top cap 110 may include a highly reliable, vertically oriented cable grip mechanism 120 housed within cable grip portion 118. The high-load ground anchor 130 may include the substantially cylindrical body 132 that has tapered piercing end 134 and flat driving end 140 and wherein flat driving end 140 has central driving hole 142. Additionally, the high-load ground anchor 130 may include a pair of outwardly extending side wings 144 along one side of body 132 and the raised securing portion 146 on the side of body 132 opposite side wings 144.

In some embodiments, the presently disclosed ground anchor assembly 100 and method 300 provide an 80-mm long ground anchor 130, a 120-mm long ground anchor 430, and a 170-mm to 180-mm long ground anchor 530.

In some embodiments, the presently disclosed ground anchor assembly 100 and method 300 provide a high-load ground anchor 130 that may have, for example, a "bell-shaped" cross section and a "cleat-shaped" footprint that provides a high pullout resistance.

In some embodiments, the presently disclosed ground anchor assembly 100 and method 300 provide a high-load ground anchor 130 with multiple drive options, such as, but not limited to, (1) a drive rod (e.g., drive rods 670, 690)

positioned to strike the inside of ground anchor 130, or (2) a drive rod (e.g., drive rods 170, 680) positioned to strike the back end, external face of ground anchor 130.

Referring now to FIGS. 37A-37B are a top cross-sectional view and a side cross-sectional view, respectively, showing more details of cable grip mechanism 120 of top cap 110 of the presently disclosed ground anchor assembly 100. In this example, cable grip mechanism 120 may include spring 121, a spring cap 124 that has a cable exit opening 126, a gripping/wedge component 127 that has a cable entrance opening 128, a ball bearing 129 located at the end of spring 121 near cable entrance opening 128, and a release pin opening 131 located near ball bearing 129. Gripping/wedge component 127 can be spherical, cylindrical, wedge shaped or other tapered shape.

The internal configuration of the keyhole-shaped shaft 122 at gripping/wedge component 127 provides continuous reduction in cross section, crushing instead of pinching cable tendon 150. Cable tendon 150 may be entirely in contact with cable grip mechanism 120 or internal wall of the cable grip mechanism 120. This yields a high grip strength. The roller can be any shape, such as a ball bearing.

The keyhole shape keeps the grip components away from cable tendon 150, in a separate chamber. This means the grip components do not get tangled up and work very reliably. Further, the release port aligns with ball bearing 129 (i.e., the grip element), so when a pin (not shown) is inserted, it pushes ball bearing 129 in-line with its direction of travel. By contrast, conventional ground anchors use a steeper angle, which means the release pin can easily go around the grip element and get tangled in the wire or spring, etc.

In top cap 110, spring cap 124 may be an octagonal-shaped cap that can be specifically shaped to use screws and be tightened in such a fashion to provide a second grip on cable tendon 150 (not shown). When tightened, the cap (metal) is tapered, closing the gap between the cable and housing. This pinch point fixes the cable to the housing. Ball bearing 129 is still the load-bearing element. However, this second pinch ensures any vibration transmitted to cable tendon 150 by what is being held down is arrested before it gets to the load-bearing element. This helps in keeping the grip from releasing in earthquakes, wind or other dynamic loading.

The vertical arrangement of cable grip mechanism 120 and cable tendon 150 allows for easier release. When in use cable grip mechanism 120 is essentially vertical, and cable tendon 150 deflects around cable grip mechanism 120, which results in about a 10-degree angle. This is dramatically less than 30 degrees in competitive offerings. Aligning the forces as close to parallel as possible increases the grip strength and reliability.

FIG. 38 illustrates a side cross-sectional view showing exemplary details of a dual-grip cable grip mechanism 3820 of a top cap 3810 of the presently disclosed ground anchor assembly 3800 (where the top cap 3810 is combined with a cable and/or a load-bearing plate to form assembly 3800). In an embodiment of the invention, the keyhole-shaft design and tapering of the shaft through the top cap 3810 enables the disposition of two or more ball bearings 3829 within the shaft, the use of two ball bearings imparting a "dual" grip, where more than two ball bearings would increase the grip number. In an embodiment of the invention, the two or more balls are not of the same dimensions, for example, the bottom ball can be about 10% smaller than the top ball, where the top ball is of a standard/conventional diameter, such as the ball bearing 129 shown in FIGS. 37A-37B. Currently available products that use multiple gripping elements require a cage around them to force them to move together. The design of cable grip mechanism 3820 described herein obviates the need for such a cage.

In an embodiment of the invention, cable grip mechanism 3820 may include spring 3821, a spring cap 3824 that has a cable exit opening 3826, a gripping/wedge component 3827 that has a cable entrance opening 3828, two or more ball bearings 3829 located at the end of spring 3821 near cable entrance opening 3828, and a release pin opening 3831 located near the lowermost or bottom of the ball bearings 3829. By using two or more ball bearings 3829, the gripping load/force applied to a cable being used with the cable grip mechanism 3820 is spread out, significantly improving gripping strength while also allowing for the use of a "softer" cable (a higher strand count cable, for example 7×19, instead of 1×19, such as used with gripping mechanism 120), which is easier to manipulate and is less expensive than conventional cables currently used in the industry.

As with other embodiments described herein, the release pin opening (also "release port") aligns with the two or more ball bearings 3829 (i.e., the grip element), so when a pin (not shown) is inserted, it pushes the two or more ball bearings 3829 in-line with its direction of travel, easing the release procedure. By contrast, conventional ground anchors use a steeper angle, which means the release pin can easily go around the grip element and get tangled in the wire or spring, etc.

Gripping/wedge component 3827 can be spherical, cylindrical, wedge-shaped or other tapered shape. In an embodiment of the invention, spring 3821 is shortened, relative to spring 121, to accommodate any additional ball bearings 3829 disposed within the cable grip mechanism 3820. In some embodiments of the invention, the size, shape, hardness, and/or surface finish (e.g. that which controls friction) of the gripping elements is manipulated to affect grip performance of the ball bearings 3829 (similar customization can be utilized in grip mechanism 120, as well).

FIGS. 39A and 39B illustrate top and bottom perspective views, respectively, of the top cap 3810 shown in FIG. 38. FIGS. 40A and 40B illustrate top and bottom views, respectively, of the top cap 3810 shown in FIG. 38. FIG. 41A illustrates an external side view of the top cap 3810 shown in FIG. 38 and FIG. 41B illustrates a side view showing internal features of the top cap 3810 shown in FIG. 38. FIG. 42A illustrates an external front view of the top cap 3810 shown in FIG. 38 and FIG. 42B illustrates a front view showing internal features of the top cap 3810 shown in FIG. 38.

FIG. 43A illustrates atop view of a load-bearing plate 4300 usable with the top cap 3810 shown in FIG. 38, together which are used in ground anchor assembly 3800, and FIG. 43B illustrates a side view of the load-bearing plate 4300 of FIG. 43A. In an embodiment of the invention, the top cap 3810 is fastened to the load-bearing plate 4300 using the screw holes 4360 which correspond to similar holes in the top cap 3810.

FIG. 44 illustrates a top perspective view of a top cap 4410 with a crush ridge 4450, usable with any of the presently disclosed ground anchor assemblies. In an embodiment of the invention, the crush ridge 4450 (or tabs) is integrated into the top cap 4410. This crush ridge 4450 optionally replaces the grooves and tabs of the spring cap, described above. A ridge of material, about twice the thickness of the spring cap (124) is made as part of the cap, in an embodiment of the invention, thereby forming the crush ridge 4450.

This crush ridge 4450 follows around the outside of the spring cap. During manufacture/assembly the crush ridge 4450 is crushed with a hydraulic press, mobilizing the ridge material. The mobilized ridge material is displaced such that it interferes with the spring cap and holds it in place. This arrangement is unique to conventional industry offerings in that two parts are brought together and pressed in an interference fit type arrangement. It should be understood that in some embodiments, this feature (cast into the cap) allows off-the-shelf parts to serve as the spring cap, rather than requiring a custom made piece.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments±100%, in some embodiments±50%, in some embodiments±20%, in some embodiments±10%, in some embodiments±5%, in some embodiments±1%, in some embodiments±0.5%, and in some embodiments 0.10% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the subject matter herein.

The invention claimed is:

1. A ground anchor assembly comprising:
a top cap including a cable grip portion with a cable grip mechanism installed therein, wherein the cable grip portion is a compartment or housing extending to one side of the top cap and perpendicular to a plane of the top cap, including at least one ball bearing disposed within the compartment or housing, and
wherein the top cap comprises a load-bearing face plate that has an arrangement of openings that allow vegetation to grow through top cap and a sloped transition portion leading to the cable grip portion;
a ground anchor formed from a cylindrical body with a tapered piercing end and a flat driving end; and,
a cable tendon tethered between the cable grip portion of the top cap and the ground anchor,
wherein the cable grip mechanism comprises a spring, a spring cap comprising a cable exit opening, a wedge component comprising a cable entrance opening, the at least one ball bearing located at the end of the spring on a same side as the cable entrance opening of the wedged component and a release pin opening located near the ball bearing, and,
wherein the spring cap is octagonal shaped and is provided with screws for tightening onto the cable tendon to fix the cable to the top cap.

2. The ground anchor assembly of claim 1, wherein the sloped transition portion and cable grip portion are substantially octagonal shaped thereby reducing stress concentrations and increasing gripping performance.

3. The ground anchor assembly of claim 1, wherein the cable grip mechanism comprises a keyhole-shaped shaft such that when the top cap is in use, the cable tendon extends through the keyhole-shaped shaft of the cable grip portion with an approach angle less than or equal to 10 degrees to the cable grip mechanism.

4. The ground anchor assembly of claim 3, wherein the keyhole shape of the shaft keeps cable grip mechanism components in a chamber separate from the cable tendon.

5. The ground anchor assembly of claim 1, wherein the top cap includes a load-bearing face plate and wherein a key-hole shaped shaft of the cable grip portion is oriented transversely or vertically to the load-bearing face plate when the top cap is in use.

6. The ground anchor assembly of claim 1, wherein the wedge component is spherical, cylindrical, wedge shaped or tapered.

7. The ground anchor assembly of claim 1, wherein the wedge component continuously reduces in cross-section.

8. The ground anchor assembly of claim 1, wherein the cable tendon is entirely in contact with the cable grip mechanism.

9. The ground anchor assembly of claim 1, wherein the release port aligns with the at least one ball bearing.

10. The ground anchor assembly of claim 1, wherein the cable grip mechanism comprises two ball bearings for spreading out the gripping force applied to the cable tendon by the cable grip mechanism.

11. The ground anchor assembly of claim 10, wherein one of the two ball bearings is smaller than the other.

12. The ground anchor assembly of claim 11, wherein the smaller ball bearing is located closer to a cable entrance opening of the cable grip mechanism than the larger ball bearing.

13. The ground anchor assembly of claim 11, wherein the smaller ball bearing is 10% smaller than the other ball bearing.

14. The ground anchor assembly of claim 13, wherein the size of the smaller ball bearing is determined by a tapering characteristic of the cable grip mechanism.

15. The ground anchor assembly of claim 10, wherein the cable tendon uses a 7×19 strand.

16. The ground anchor assembly of claim 1, wherein the top cap is formed of at least one of a zinc alloy, a plastic, an aluminum, stainless steel, coated steel, and brass.

17. The ground anchor assembly of claim 1, wherein the overall diameter of top cap may is about 101.7 mm and the overall depth of top cap is about 38 mm.

18. The ground anchor assembly of claim 1, wherein the cable grip mechanism provides a one-way stop.

19. The ground anchor assembly of claim 1, wherein at least one of the size, shape, hardness, and surface finish of the at least one ball bearing is altered to modify grip performance of the at least one ball bearing.

20. The ground anchor assembly of claim 1, wherein the top cap comprises at least one tab hole to allow the spring cap to be held in place without the use of transverse casting cores.

21. The ground anchor assembly of claim 1, wherein the flat driving end has a central driving hole.

22. The ground anchor assembly of claim 1, wherein the piercing end further comprises an arrangement of piercing end grooves and piercing end ribs.

23. The ground anchor assembly of claim 1, wherein the tapered piercing end is generally conical and wherein the piercing end ribs are equally distanced apart and terminate at a leading edge, wherein the leading edge has the plurality of piercing end grooves, which are symmetrical.

24. The ground anchor assembly of claim 1, wherein the ground anchor comprises at least one outwardly extending side wing.

25. The ground anchor assembly of claim 24, comprising a pair of outwardly extending side wings lying within the same plane.

26. The ground anchor assembly of claim 1, wherein the ground anchor comprises a raised securing portion.

27. The ground anchor assembly of claim 26, wherein the ground anchor further comprises at least one outwardly extending side wing lying in a plane transverse to the raised securing portion.

28. The ground anchor assembly of claim 26, wherein the raised securing portion comprises a thru-hole used for securing the cable tendon to the ground anchor.

29. The ground anchor assembly of claim 1, wherein the ground anchor is formed from at least one of a zinc alloy, ductile iron, aluminum, stainless steel, and brass.

30. The ground anchor assembly of claim 1, wherein the ground anchor has a bell-shaped cross-section.

31. The ground anchor assembly of claim 1, wherein the ground anchor has a cleat-shaped footprint.

32. The ground anchor assembly of claim 1, wherein the flat driving end is configured with a strike face inside a driving hole provided to the flat driving end or on an end of the substantially cylindrical body at the flat driving end.

33. The ground anchor assembly of claim 1, wherein the cable tendon is a ⅛-inch diameter zinc alloy-coated steel or steel cable.

34. The ground anchor assembly of claim 1, further comprising a drive rod for driving ground anchor into the ground.

35. The ground anchor assembly of claim 34, wherein the drive rod is configured to push against at least one strike face of the ground anchor, the at least one strike face located inside a driving hole of the ground anchor and/or on a flat driving end of the ground anchor.

36. The ground anchor assembly of claim 34, further comprising a rod tip.

37. The ground anchor assembly of claim 36, further comprising a flat shoulder portion, wherein the rod tip provides alignment of the drive rod during driving.

38. The ground anchor assembly of claim 37, wherein the flat shoulder portion is 0.1 to 0.2 inches wide.

39. The ground anchor assembly of claim 37, wherein the flat shoulder portion is 0.1 to 0.2 inches wide.

40. The ground anchor assembly of claim 36, wherein the driving rod is configured such that the flat shoulder portion strikes the flat driving end of the ground anchor without the rod tip striking the ground anchor during driving.

41. The ground anchor assembly of claim 36, wherein the overall length of the drive rod is 4 feet and the diameter of the drive rod is 0.5 to 1 inch and wherein the length of the rod tip is 2-3 inches and the diameter of the rod tip is 0.4 to 0.5 inches.

42. The ground anchor assembly of claim 41, wherein the rod tip tapers from 0.45 inches to 0.4 inches.

43. The ground anchor assembly of claim 41, wherein the rod tip tapers from 0.435 inches to 0.41 inches.

44. The ground anchor assembly of claim 36, wherein the overall length of the drive rod is 7 feet and the diameter of the drive rod is 0.5 to 1 inch and wherein the length of the rod tip is 4-5 inches and the diameter of the rod tip is 0.5 to 0.7 inches.

45. The ground anchor assembly of claim 44, wherein the rod tip tapers from 0.65 inches to 0.565 inches.

46. The ground anchor assembly of claim 44, wherein the flat shoulder portion is 0.1 to 0.2 inches wide.

47. The ground anchor assembly of claim 36, wherein the overall length of the drive rod is 7 feet and the diameter of the drive rod is 0.5 to 1 inch and wherein the length of the rod tip is 6-7 inches and the diameter of the rod tip is 0.5 to 0.7 inches.

48. A method of installing a ground anchor assembly according to claim 1, comprising:

providing the ground anchor assembly at a job site;

driving the ground anchor into the ground using a drive rod to impart percussion drive forces onto the ground anchor, with the attached cable tendon extending out of the ground;

passing a proximal end of the cable tendon through any layers of ground reinforcement materials;

threading the proximal end of the cable tendon through the top cap;

positioning the top cap atop the ground with the cable grip portion oriented towards the ground;

pushing the top cap into the ground until an underside of a load-bearing plate of the top cap presses against the ground;

tensioning the cable tendon until the desired cable tension is reached which turns the ground anchor orthogonal to the cable tendon direction, thereby mounting a resistance to pullout and setting the ground anchor in the ground; and, securing the cable tendon.

49. The method according to claim 48, wherein the driving is achieved by inserting a rod tip of the drive rod into a driving hole in a driving end of the ground anchor.

50. The method according to claim 48, wherein the driving is achieved by applying the percussive force to a flat portion of the driving end of the ground anchor.

51. The method according to claim 48, wherein securing comprises locking the proximal end of the cable tendon to the top cap using the cable grip mechanism of the cable grip portion.

52. The method according to claim 51, further comprising cutting off excess cable tendon after the locking.

53. The method according to claim 48, securing comprises fastening the proximal end of the cable tendon to an object to be supported and/or stabilized.

54. An anchor reinforced vegetation system, comprising:

a plurality of ground anchor assemblies according to claim 1; and, a turf reinforcement mat through which the plurality of ground anchor assemblies is inserted positioning the high-performance turf reinforcement mat between the top caps of the ground anchor assemblies and the ground.

55. A ground anchor assembly comprising:

a top cap including a cable grip portion, wherein the cable grip portion is a compartment or housing extending to one side of the top cap and perpendicular to a plane of the top cap, including at least one ball bearing disposed within the compartment or housing, wherein the top cap comprises a crush ridge and wherein the crush ridge follows around an outside circumference of a spring cap of the cable grip portion;

a ground anchor formed from a cylindrical body with a tapered piercing end and a flat driving end; and, a cable tendon tethered between the cable grip portion of the top cap and the ground anchor.

56. The ground anchor assembly of claim 55, wherein the crush ridge is about twice the thickness of the spring cap.

\* \* \* \* \*